US010300922B2

(12) United States Patent
Volos et al.

(10) Patent No.: US 10,300,922 B2
(45) Date of Patent: May 28, 2019

(54) RISK ASSESSMENT SYSTEM FOR ASSESSING CURRENT DRIVER BEHAVIOR RELATIVE TO PAST BEHAVIOR AND BEHAVIORS OF OTHER DRIVERS

(71) Applicants: Denso International America, Inc., Southfield, MI (US); DENSO CORPORATION, Kariya, Aichi-pref. (JP)

(72) Inventors: Haris Volos, Sunnyvale, CA (US); Kenji Konishi, San Jose, CA (US); Kazuhito Takenaka, Obu (JP); Yuki Shinohara, Anjo (JP); Hideaki Misawa, Chiryu (JP)

(73) Assignees: DENSO International America, Inc., Southfield, MI (US); DENSO CORPORATION, Kariya, Aichi-pref. (JP)

( * ) Notice: Subject to any disclaimer, the term of this patent is extended or adjusted under 35 U.S.C. 154(b) by 0 days.

(21) Appl. No.: 15/720,775

(22) Filed: Sep. 29, 2017

(65) Prior Publication Data
US 2019/0100216 A1 Apr. 4, 2019

(51) Int. Cl.
*B60Q 1/00* (2006.01)
*B60W 40/09* (2012.01)
(Continued)

(52) U.S. Cl.
CPC ............ *B60W 40/09* (2013.01); *G01S 19/42* (2013.01); *G06Q 10/0635* (2013.01);
(Continued)

(58) Field of Classification Search
CPC ... B60W 40/09; B60W 2540/30; G01S 19/42; G06Q 10/0635; G06Q 40/08; G07C 5/008
See application file for complete search history.

(56) References Cited

U.S. PATENT DOCUMENTS

| 5,418,726 A * | 5/1995 | Yagi ...................... B60K 28/16 180/197 |
| 7,343,306 B1 * | 3/2008 | Bates .................... G06Q 40/08 701/32.4 |

(Continued)

FOREIGN PATENT DOCUMENTS

| JP | 2007176396 A | 7/2007 |
| JP | 2007334479 A | 12/2007 |
| JP | 2013250663 A | 12/2013 |

OTHER PUBLICATIONS

T Taniguchi et al, "Semiotic Prediction of Driving Behavior Using Unsupervised Double Articulation Analyzer," IEEE Intelligent Vehicles Symposium, Jun. 2012.

(Continued)

*Primary Examiner* — Quang Pham
(74) *Attorney, Agent, or Firm* — Harness, Dickey & Pierce, P.L.C.

(57) ABSTRACT

A risk assessment system is provided and includes a behavior description generator, driving behavior comparator, and risk assessment modules and a transceiver. The behavior description generator module receives a set of driving features and topics corresponding to a driving behavior of a first driver in a location and under a set of driving conditions. The driving behavior comparator module: compares the set of driving features and the topics to other sets of features and topics, which correspond to driving behaviors of other drivers for the location and same or similar driving conditions as the set of driving conditions; and generates an anomaly score for the first driver based on results of the comparison. The risk assessment module calculates a risk assessment score for the driver based on the anomaly score, where the risk assessment score is indicative of a risk level of the first driver relative to the other drivers.

22 Claims, 23 Drawing Sheets

(51) Int. Cl.
  *G07C 5/00* (2006.01)
  *G06Q 40/08* (2012.01)
  *G01S 19/42* (2010.01)
  *G06Q 10/06* (2012.01)

(52) U.S. Cl.
  CPC ............ *G06Q 40/08* (2013.01); *G07C 5/008* (2013.01); *B60W 2540/30* (2013.01)

(56) References Cited

U.S. PATENT DOCUMENTS

| | | | | |
|---|---|---|---|---|
| 8,452,529 | B2* | 5/2013 | Alten | G01C 21/3484 701/117 |
| 9,527,384 | B2* | 12/2016 | Bando | B60K 28/066 |
| 2003/0125854 | A1* | 7/2003 | Kawasaki | G07C 5/008 701/431 |
| 2003/0194271 | A1* | 10/2003 | Solon | B26D 3/005 404/15 |
| 2006/0100958 | A1* | 5/2006 | Cheng | G06Q 10/0631 705/38 |
| 2008/0255888 | A1* | 10/2008 | Berkobin | G06Q 40/08 705/4 |
| 2009/0234552 | A1* | 9/2009 | Takeda | B60W 30/16 701/96 |
| 2010/0292971 | A1* | 11/2010 | Sachse | G08G 1/07 703/6 |
| 2012/0280835 | A1* | 11/2012 | Raz | G08G 1/0112 340/905 |
| 2013/0166098 | A1* | 6/2013 | Lavie | G06F 17/00 701/1 |
| 2013/0289873 | A1* | 10/2013 | Mitchell | G06F 17/00 701/482 |
| 2014/0142989 | A1* | 5/2014 | Grosso | G06Q 10/00 705/4 |
| 2014/0244125 | A1* | 8/2014 | Dorum | G01C 21/32 701/70 |
| 2014/0350777 | A1* | 11/2014 | Kawai | G07C 5/0808 701/32.3 |
| 2015/0112546 | A1* | 4/2015 | Ochsendorf | G07C 5/0841 701/33.4 |
| 2015/0149020 | A1* | 5/2015 | Smith | B60W 40/09 701/23 |
| 2015/0262435 | A1* | 9/2015 | Delong | G07C 5/0816 340/439 |

OTHER PUBLICATIONS

K. Takenaka et al, "Contextual Scene Segmentation of Driving Behavior Based on Double Articulation Analyzer," IEEE/RSJ International Conference on Intelligent Robots and Systems, Oct. 2012.

D. Blei et al, "Latent Dirichlet Allocation", Journal of Machine Learning Research, 2003.

T. Griffiths & M. Steyvers, "Finding Scientific Topics," Proceedings of the National Academy of Sciences, Apr. 2004.

T. Nakamura et al, "Grounding of Word Meanings in Multimodal Concepts Using LDA," IEEE/RSJ International Conference on Intelligent Robots and Systems, Oct. 2009.

* cited by examiner

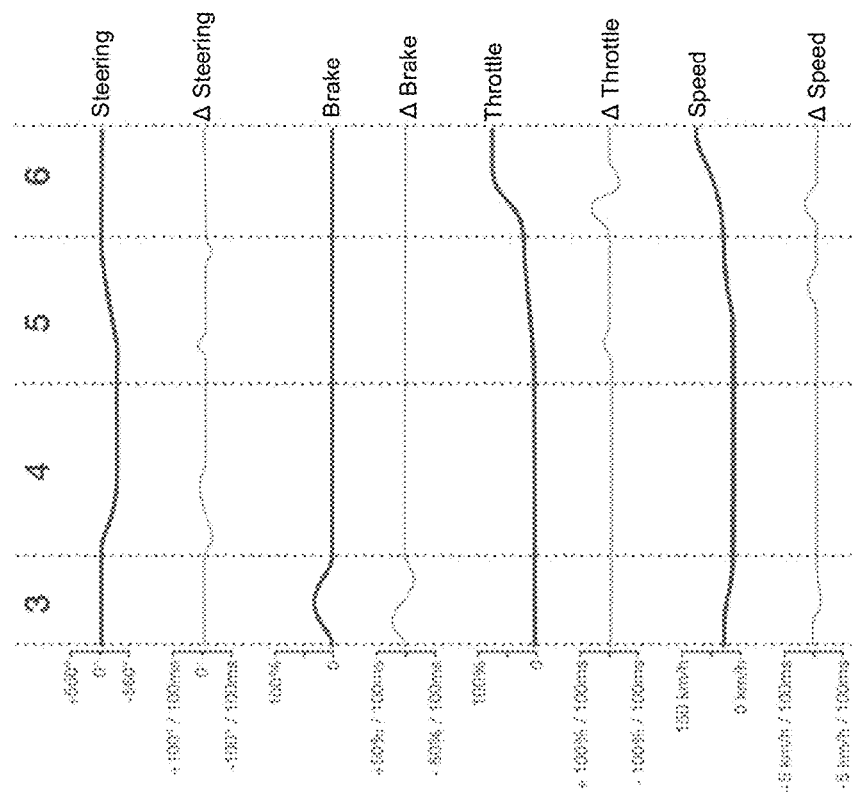
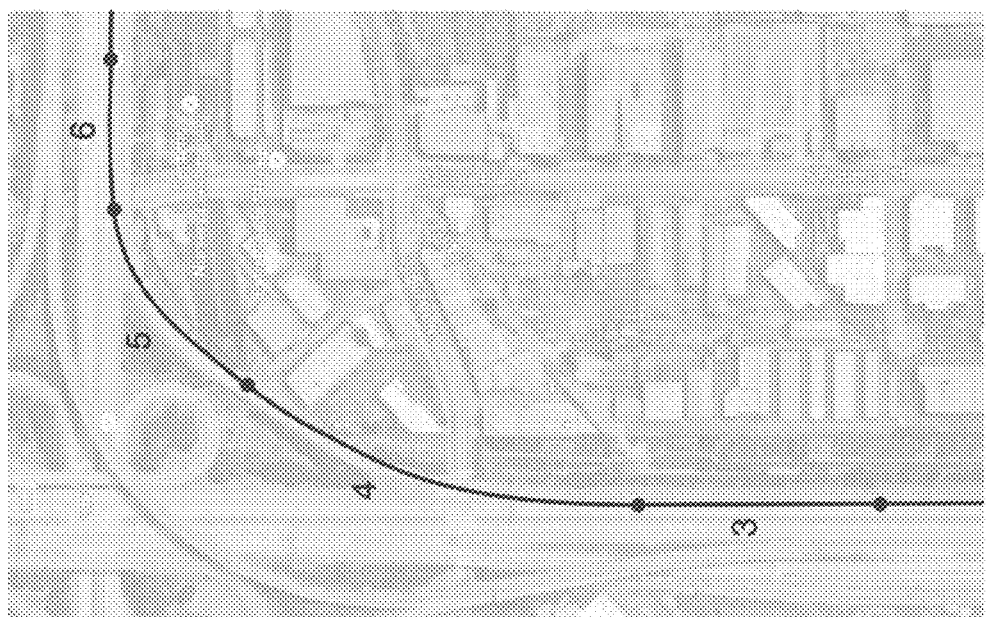
FIG. 14

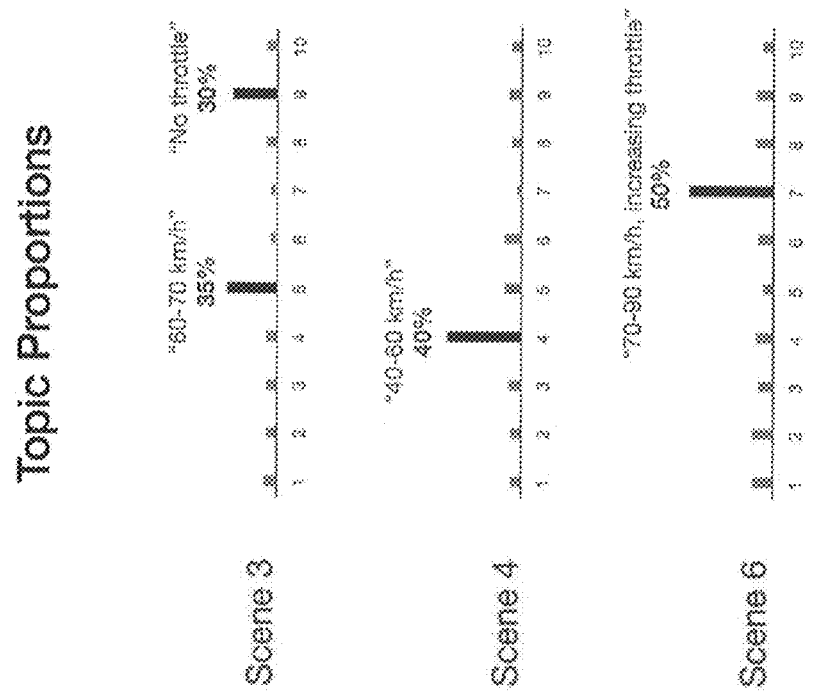
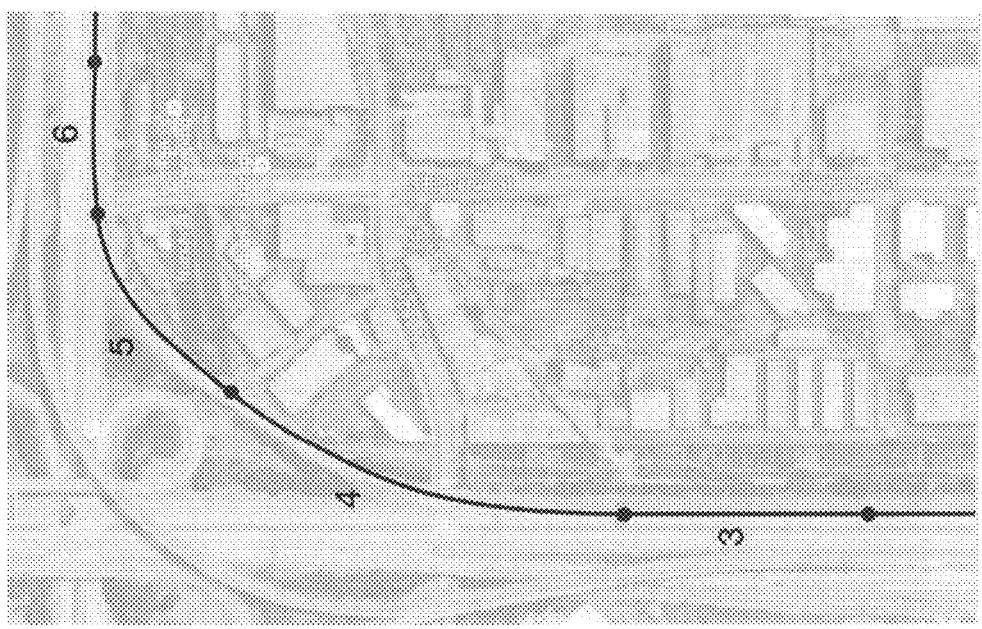
FIG. 15

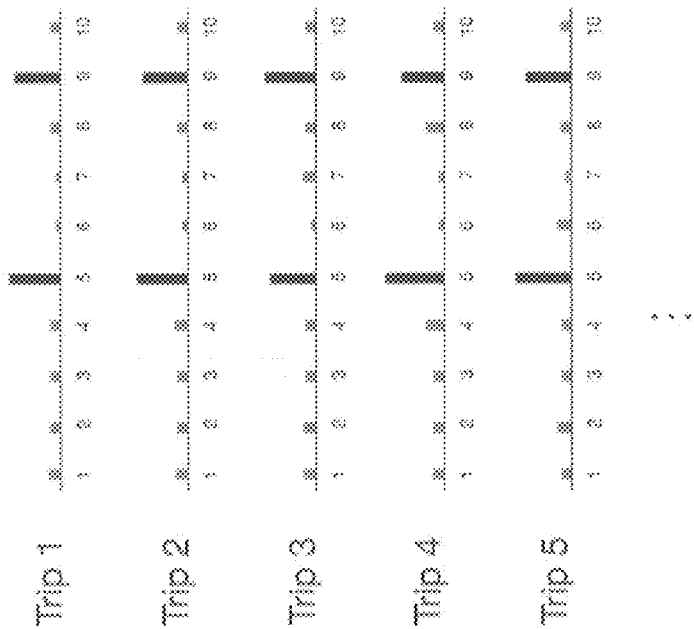
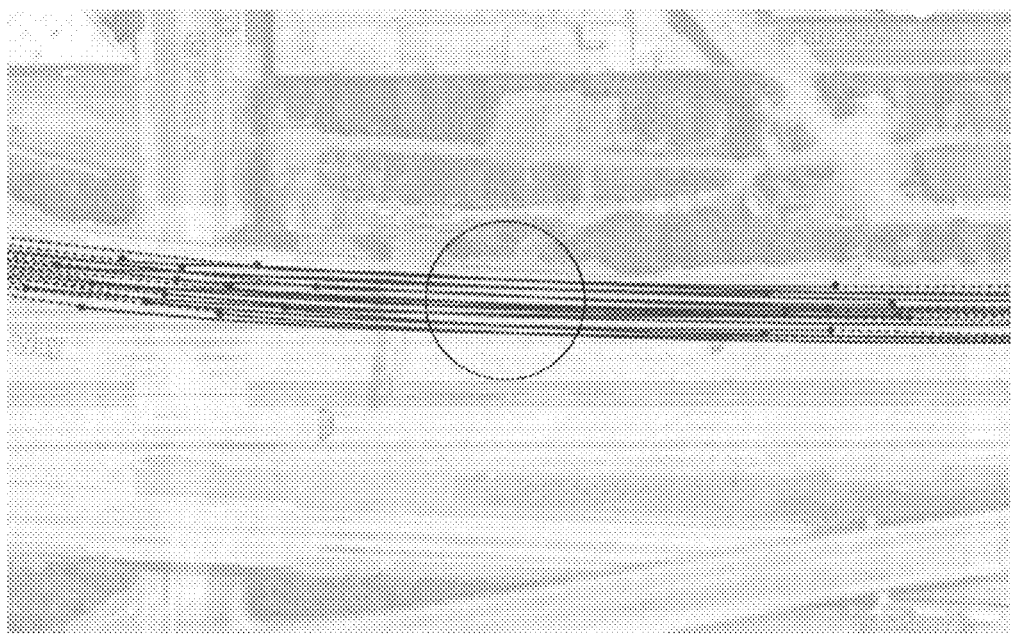
FIG. 16

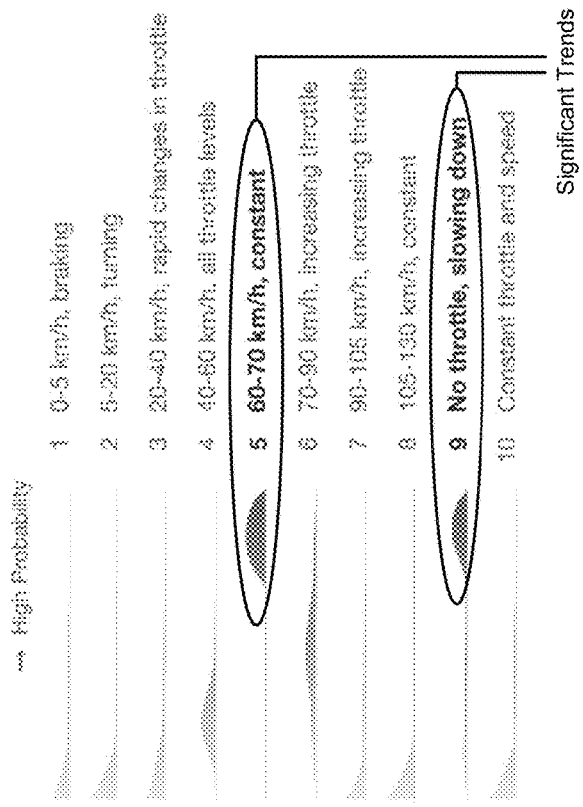
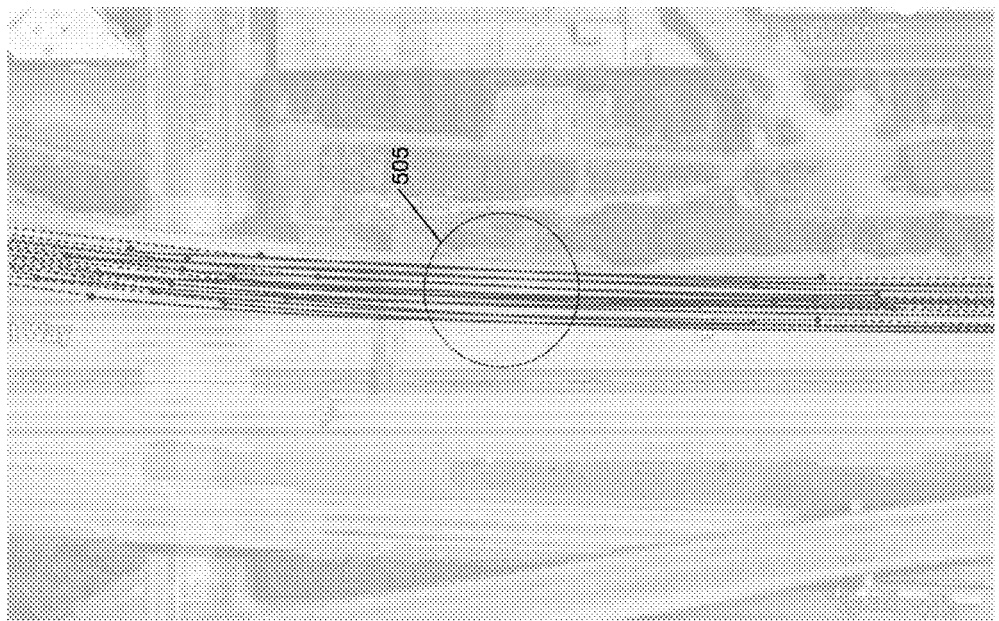
FIG. 17

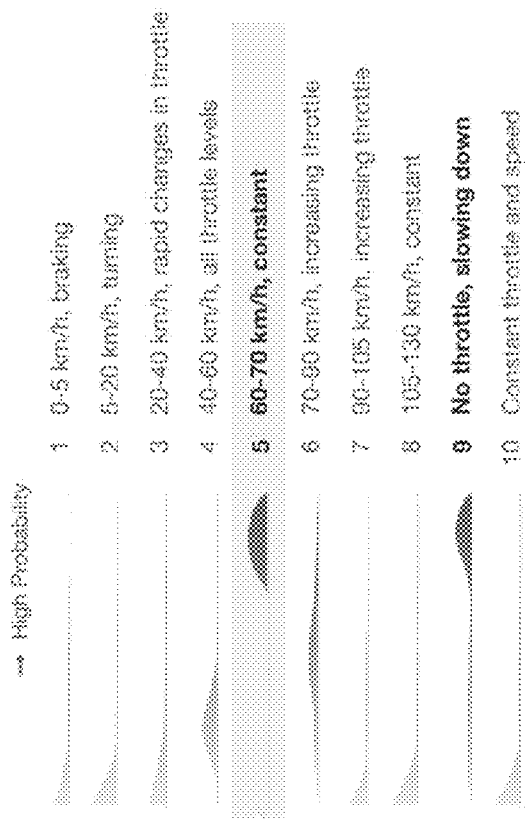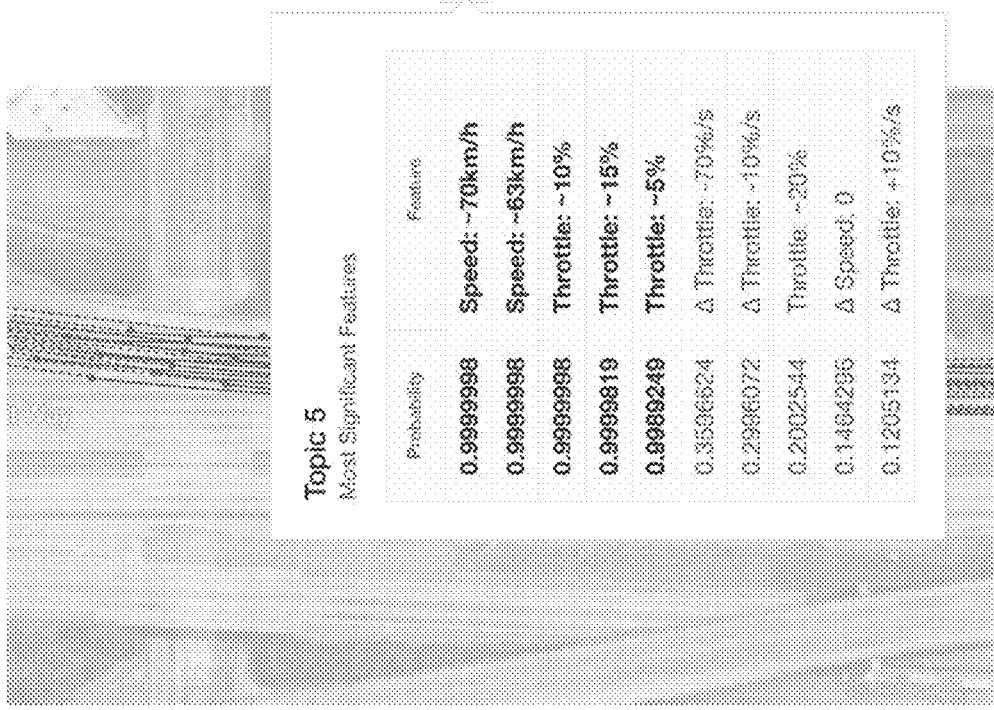
FIG. 18

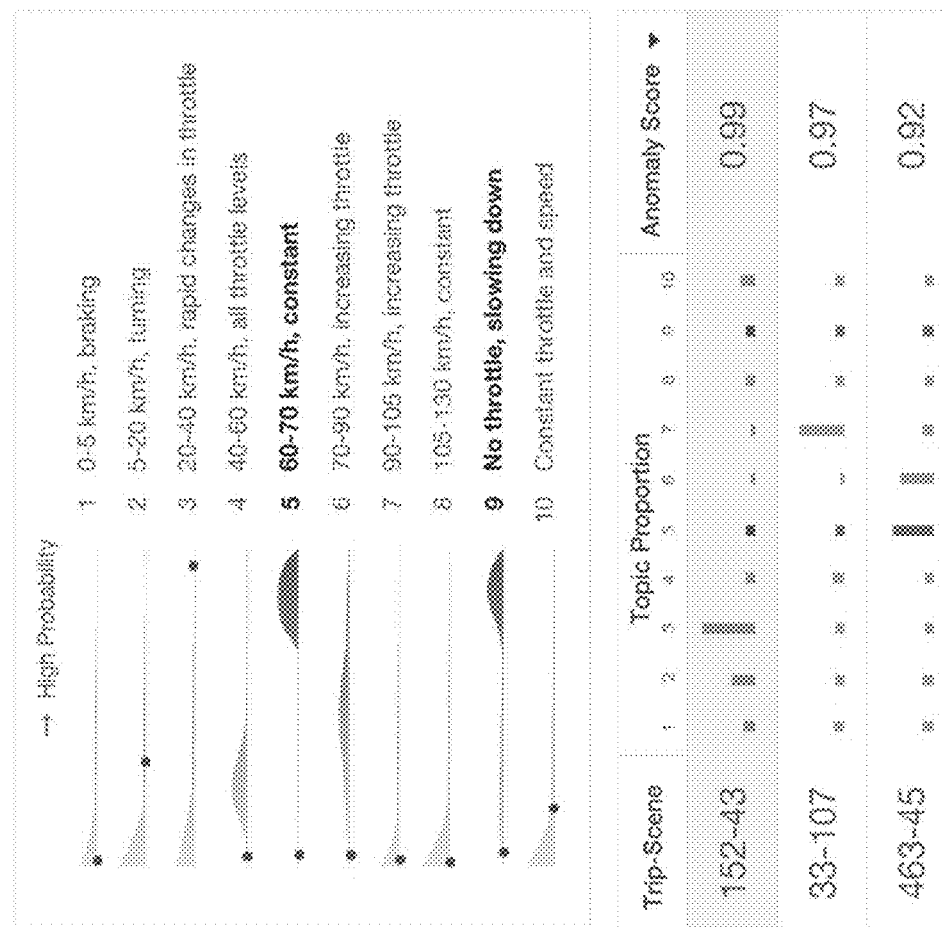
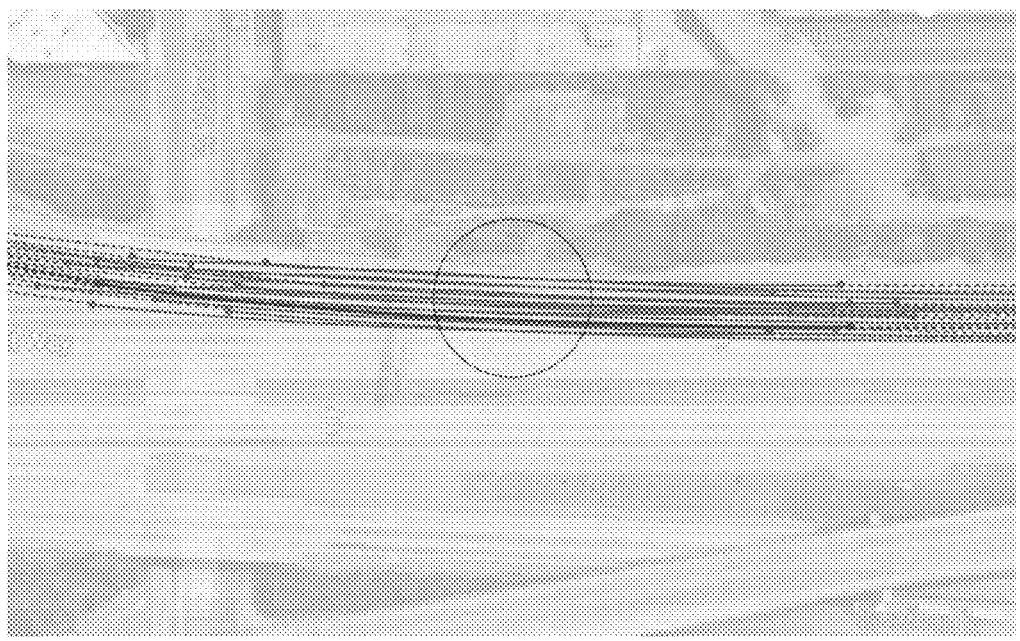
FIG. 20

RISK ASSESSMENT SYSTEM FOR ASSESSING CURRENT DRIVER BEHAVIOR RELATIVE TO PAST BEHAVIOR AND BEHAVIORS OF OTHER DRIVERS

CROSS-REFERENCE TO RELATED APPLICATIONS

The present disclosure is related to U.S. patent application Ser. No. 14/731,766 filed on Jun. 5, 2015, now U.S. Pat. No. 9,527,384. The entire disclosure of the application referenced above is incorporated herein by reference.

FIELD

The present disclosure relates to driver risk assessment systems.

BACKGROUND

The background description provided here is for the purpose of generally presenting the context of the disclosure. Work of the presently named inventors, to the extent it is described in this background section, as well as aspects of the description that may not otherwise qualify as prior art at the time of filing, are neither expressly nor impliedly admitted as prior art against the present disclosure.

Traditional driver risk assessment systems that are used by insurance companies and fleet management companies compare driver parameters with predetermined thresholds and assess driver risk based on these comparisons. Example parameters are vehicle speed and acceleration. For example, if a vehicle speed exceeds a predetermined threshold, a driver risk assessment system may reduce an assessment score of the corresponding driver. The assessment score may be provided to an insurance company and/or a fleet management company. The insurance company may adjust an insurance rate of the driver based on the assessment score. The driver may be a taxi, track or bus driver for the fleet management company and the fleet management company may adjust a pay rate of the driver based on the assessment score.

SUMMARY

A risk assessment system is provided and includes a behavior description generator module, a driving behavior comparator module, a risk assessment module, and a transceiver. The behavior description generator module is configured to receive a first set of driving features and topics corresponding to a driving behavior of a first driver of a first vehicle in a location and under a first set of driving conditions. The driving behavior comparator module is configured to (i) compare the first set of driving features and the topics to one or more other sets of features and topics, wherein the one or more other sets of features and topics correspond to driving behaviors of other drivers for the location and same or similar driving conditions as the first set of driving conditions, and (ii) generate an anomaly score for the first driver based on results of the comparison. The risk assessment module is configured to calculate a risk assessment score for the driver based on the anomaly score, wherein the risk assessment score is indicative of a risk level of the first driver relative to the other drivers. The transceiver is configured to transmit the risk assessment score from a risk assessment server to at least one of a vehicle control module of the first vehicle or a second server, where the risk assessment server and the second server are separate from the first vehicle.

In other features, a risk assessment system is provided and includes a driving behavior comparator module, an assessment module, and a transceiver. The driving behavior comparator module is configured to (i) perform comparisons between sets of features and topics for driving behaviors of drivers, where each of the comparisons is for a same driving location and same or similar driving conditions, and (ii) generate anomaly scores for the drivers based on results of the comparison. The assessment module is configured to, based on the anomaly scores, determine at least one of a common driving behavior or a trend in the driving behaviors of the drivers for the driving locations and corresponding ones of the driving conditions. The transceiver is configured to transmit information regarding the common driving behavior or the trend in the driving behaviors of the drivers to a target vehicle for at least one of training a driver of the target vehicle or autonomous control of the target vehicle.

In other features, a system for a first vehicle is provided. The system includes sensors, a transceiver, and a vehicle control module. The sensors and a global positioning system configured to determine parameters and driving conditions for a location of the first vehicle. The parameters indicate at least a current or upcoming location of the first vehicle. The transceiver is configured to transmit from the first vehicle the parameters and driving conditions to a risk assessment server. The risk assessment server is separate from the vehicle. The transceiver is configured to, based on the parameters and driving conditions, receive information regarding a common driving behavior for multiple drivers. The drivers do not include a first driver of the first vehicle. The common driving behavior is indicative of an average driving behavior of the drivers for the current or upcoming location. The vehicle control module is configured to, based on the information regarding the common driving behavior, at least one of (i) train the first driver of the first vehicle, or (ii) autonomously control operation of the first vehicle.

Further areas of applicability of the present disclosure will become apparent from the detailed description, the claims and the drawings. The detailed description and specific examples are intended for purposes of illustration only and are not intended to limit the scope of the disclosure.

BRIEF DESCRIPTION OF THE DRAWINGS

The present disclosure will become more fully understood from the detailed description and the accompanying drawings, wherein:

FIG. 14 is top view of example locations and plots of parameters for a vehicle at the locations in accordance with an embodiment of the present disclosure;

FIG. 15 is a graphical view illustrating example topic proportions for some of the scenes of FIG. 14;

FIG. 16 is a graphical view illustrating example topic proportions for individual scenes;

FIG. 17 is a graphical view illustrating example distributions of the scenes of FIG. 16;

FIG. 18 is a graphical view illustrating probabilities and features of one of the topics of the scenes of FIG. 16;

FIG. 20 is a graphical view illustrating example topic proportions and anomaly scores, including an outlier anomaly score, for different trips corresponding to the scenes of FIG. 16;

In the drawings, reference numbers may be reused to identify similar and/or identical elements.

DETAILED DESCRIPTION

Drivers that exhibit similar driving behavior as other drivers in a same location at a similar time of day and under similar driving conditions tend to be safer drivers than drivers that exhibit different driving behavior. This is because the drivers that exhibit similar driving behavior tend to be safer drivers, since their behavior is common and expected. Traditional risk assessment systems do not consider driving behavior and trends of multiple drivers when evaluating risk of a certain driver. A driver risk assessment server is disclosed herein that monitors driving behaviors of drivers in various locations at corresponding times of day and under corresponding conditions. The driving behaviors that are related due to being associated with a similar location and conditions are compared to assess risk of each driver. This provides improved and more accurate risk assessment.

An insurance company may consider an amount of driving experience of a driver as an indicator of a skill level of that driver. A driver with a higher skill level may pay less for insurance than a driver with a low skill level. As a result, drivers that do not drive often, such as drivers that utilize car sharing programs to minimize transportations costs may be required to pay more for car insurance. This may be due to a perceived skill level of the driver corresponding to the driver's low level of driving experience irrespective of how safe the actual driving behavior is of the driver. The disclosed driver risk assessment server provides risk assessment scores to indicate how safe the actual driving behavior is of a driver. This allows safer drivers to be identified, which allows insurance companies to more accurately set insurance rates for drivers. This also enables insurance companies to provide incentives to riskier drivers to improve their driving habits and/or behavior and as a result become safer drivers.

Data science is the practice of applying correct models to correct data to provide insights. Data science is used in the following disclosed implementation examples to describe and understand driving behavior and improve operations of advanced driver assistance systems and after-market services.

Figure 1:
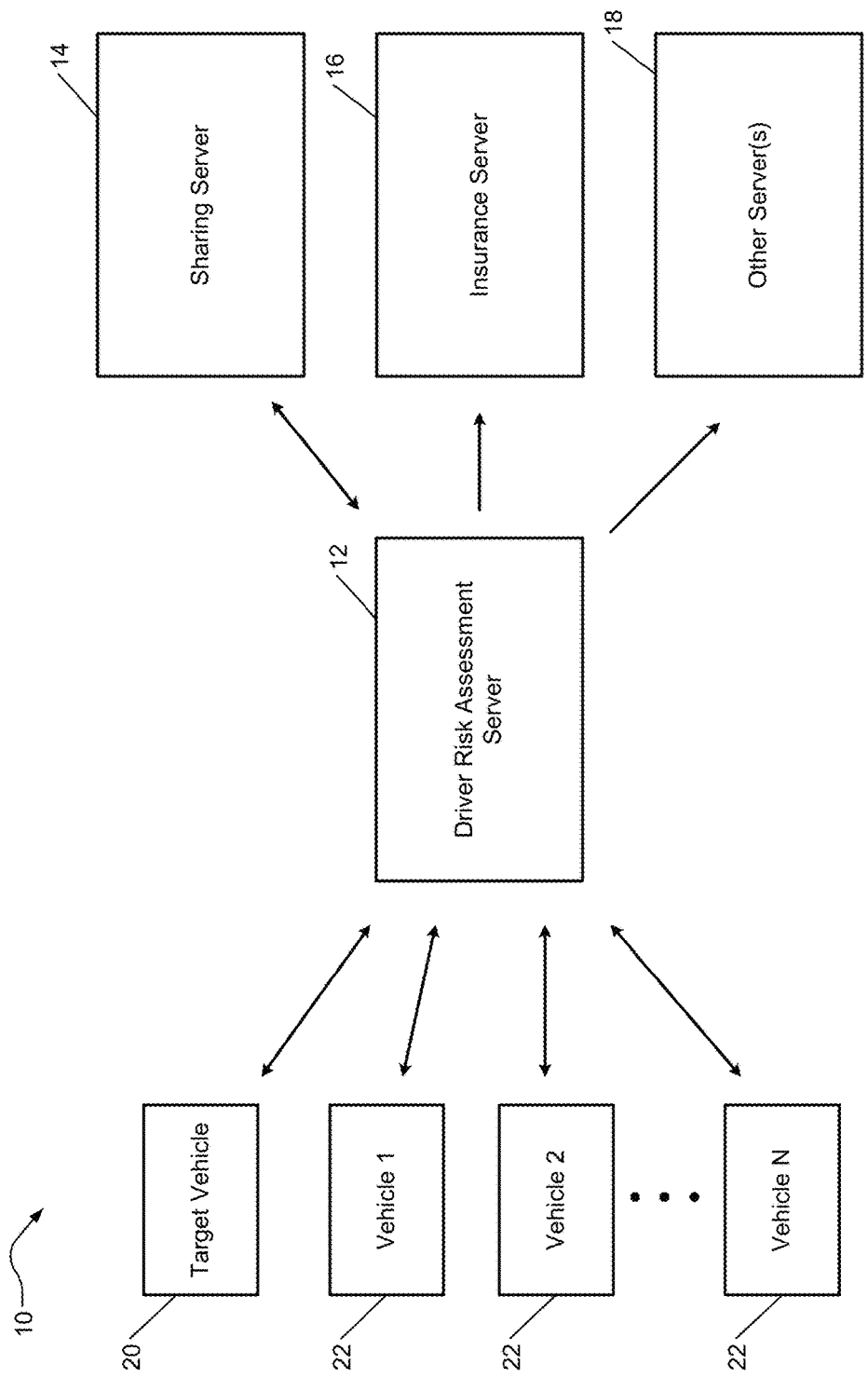
FIG. 1 is a functional block diagram of an example of a driver risk assessment system including a risk assessment server in accordance with an embodiment of the present disclosure.

FIG. 1 shows a driver risk assessment system 10 that includes vehicles, a risk assessment server 12, a sharing server 14, an insurance server 16 and one or more other servers 18. Although not shown, communication between the servers 12, 14, 16, 18 and the vehicles 20, 22 may be via base stations, satellites, gateways, switches, and/or other intermediary communication devices. The vehicles may include a target vehicle 20 and other vehicles 22. Any one of the vehicles 20, 22 may be a target vehicle. A target vehicle refers to a vehicle including a driver for which driving behavior is being monitored and evaluated for risk assessment via the driver risk assessment server 12. The other servers may include, for example, a fleet management server and/or other third party servers. The vehicles may communicate various information including parameters, features, etc. describing behavior of the vehicles to the driver risk assessment server 12, which may then provide feedback to the vehicles 20, 22 and/or provide risk assessment scores and/or other driving behavior related information to the servers 14, 16, 18. The feedback may include the driver behavior related information. A feature may refer to, for example, a range (e.g., 60-70 km/hr) of a parameter (e.g., vehicle speed) or a certain behavior (e.g., braking, increasing speed, turning at a certain steering angle, etc.). The vehicles 20, 22 may perform various tasks based on the feedback including reporting the assessment scores to the drivers, altering autonomous vehicle operation, training the drivers how to operate the vehicles 20, 22 in certain locations, etc.

The sharing server 14 may store: the information received from the vehicles 20, 22; the risk assessment scores; and/or other data pertaining to the vehicles 20, 22, the drivers of the vehicles 20, 22, locations through which the vehicles 20, 22 are driving, and/or conditions of the locations. The insurance server 16 may receive the risk assessment scores and adjust insurance rates for the drivers of the vehicles 20, 22. The other server(s) 18 may adjust pay rates and/or other benefits of the drivers based on the risk assessment scores. Operations of the servers 12, 14, 16, 18 and the vehicles 20, 22 are further described below.

Figure 2:
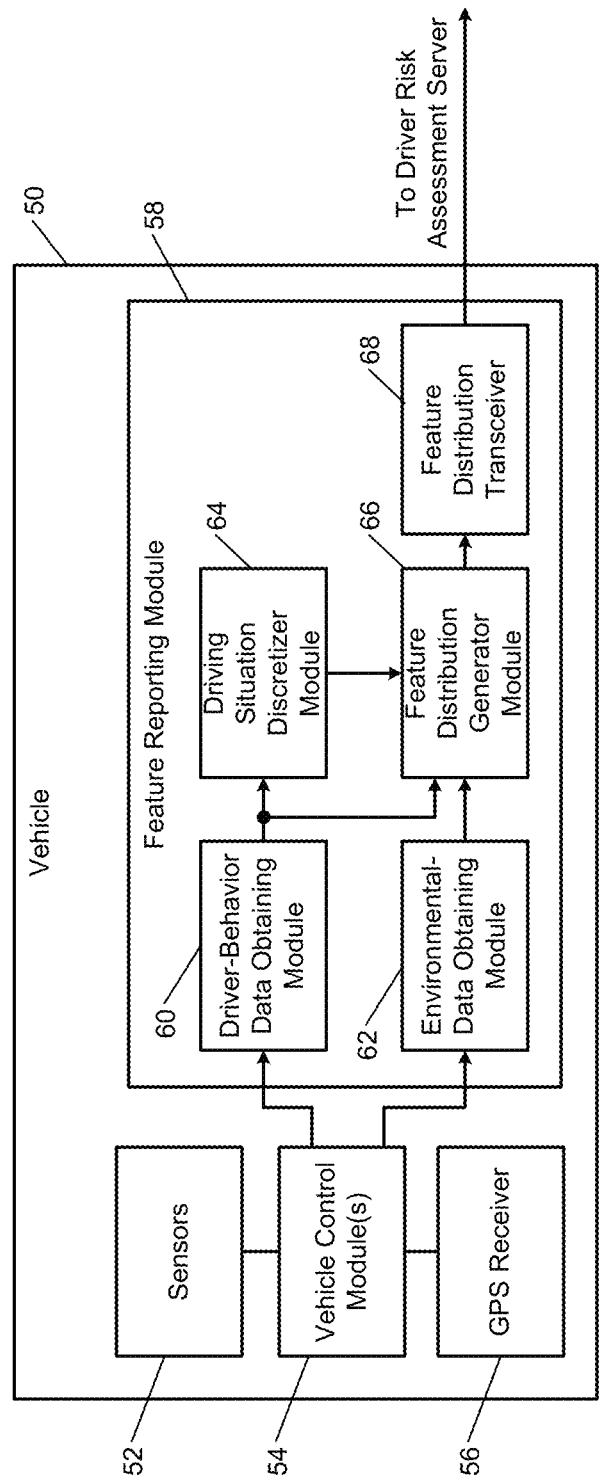
FIG. 2 is a functional block diagram of an example of a vehicle incorporating a feature reporting module in accordance with an embodiment of the present disclosure.

FIG. 2 shows an example of one of the vehicles 20, 22 of FIG. 1. The vehicle, designated 50, includes sensors 52, vehicle control modules 54, a global positioning system (GPS) receiver 56 and a feature reporting module 58. The feature reporting module 58 may be separate from the vehicle control modules 54, as shown, or may be implemented as one of the vehicle control modules 54. The feature reporting module 58 includes a driver-behavior data obtaining module 60, an environmental-data obtaining module 62, a driving situation discretizer module 64, a feature distribution generator module 66 and a feature distribution transceiver 68.

The sensors 52 may include a first type of sensors each measuring a current quantity or a current state of operation of a corresponding one of driver-operable devices (e.g., a brake pedal, a gas pedal, a steering wheel, a signal indicator, etc.) installed in the vehicle. The first type of sensors output time-series driving data sequences consisting of sequentially or cyclically measured data indicative of how the operated quantity or the operated condition of a corresponding one of the driver-operable devices changes. For example, the first type of sensors includes an accelerator sensor, a brake sensor, a steering sensor, indicator sensors, a shift-position sensor and/or other sensors. The accelerator sensor provides an output indicative of a position of a gas pedal of the vehicle and/or an acceleration rate of the vehicle. The brake sensor provides an output indicative of a position of a brake pedal, an applied pressure on a brake pedal, and/or a percentage of a total available amount of braking of the vehicle. The steering sensor provides an output indicative of a steering angle of a steering wheel of the vehicle. The indicator sensors provide outputs indicative of, for example, operation of turning signals on the vehicle. The shift position sensor provides an output indicative of a driver-selectable position of a transmission of the vehicle.

The sensors 52 also include a second type of sensors each measuring a parameter indicative of how a behavior of the vehicle changes and outputting a time-series measurement data sequence. For example, the second type of sensors may include a vehicle speed sensor, a yaw-rate sensor, image sensors (e.g., cameras), ultrasonic sensors, radar sensors, LiDAR sensors, etc. The vehicle speed sensor provides an output indicative of a speed of the vehicle. The yaw-rate sensor provides an output indicative of an angular velocity, i.e. a yaw rate around a vertical axis of the vehicle. The image sensors may provide images of an environment around the vehicle 50. The radar sensors may measure positions of objects located around the vehicle 50 and/or relative speeds of the object relative to the vehicle. The second type of sensors may also include an interior measurement unit (IMU) that repeatedly measures 3-axis (i.e. three-dimensional angular velocities and acceleration values) using gyro sensors and/or accelerometers. The sensors 52 may further be used to detect and/or determine a time zone, a date, weather conditions, and states of infrastructures located around the vehicle.

The time-series measurement data sequences of the second type of sensors represent how the behavior of the vehicle changes based on driver operations of the driver-operable devices. The time-series measurement data sequences output from the second type of sensors will be referred to as time-series behavior-data sequences.

The driving-behavior data obtaining module 60 receives the time-series driving-data sequences and the time-series behavior-data sequences from the sensors 52. This may be via one or more of the vehicle control modules 54. The driving-behavior data obtaining module 60 differentiates the time-series driving-data sequences to generate first differential data sequences. Additionally, the driving-behavior data obtaining module 60 differentiates the time-series behavior-data sequences to generate second differential data sequences. Then, the driving-behavior data obtaining module 60 groups the time-series driving-data sequences, the time-series behavior-data sequences, the first differential data sequences, and the second differential data sequences to generate multidimensional time-series data sequences. The driving-behavior data obtaining module 60 outputs, as driving behavioral data sequences, the multidimensional time-series data sequences to each of the modules 64, 66.

The environmental-data obtaining module 62 may also receive outputs of the sensors. This may be via one or more of the vehicle control modules 54, as shown. The environmental-data obtaining module 62 is connected to the GPS receiver 56, which receives signals sent from GPS satellites and generates three-dimensional positional information based on the received signals. The GPS receiver 56 outputs a time-series positional data sequence including the three-dimensional positional information. The environmental-data obtaining module 62 may receive: the time-series image data sequence; the time-series position-data sequence; the time-series relative-speed data sequence; the time-series 3D angular-velocity data sequence; the time-series acceleration-data sequence; the time-series time-zone data sequence; the time-series weather-data sequence; and the time-series infrastructural-data sequence. These data sequences represent driving environments of the vehicle. The environmental-data obtaining module 62 outputs the data sequences to the feature distribution generator module 66 as environmental data sequences.

The driving situation discretizer module 64 stores a driver model that simulates driving operations of drivers and recognition operations of the environments around each driver. The driving situation discretizer module 64 statistically analyzes the driving behavioral data sequences output from the driving-behavior data obtaining module 60. This statistic analysis extracts each point of time where a common driver feels a change from a current driving situation to another driving situation. The driving situations represent driving conditions and environments of a vehicle. For example, each of the driving situations represents various items of information indicative of how the driver drives a vehicle in certain environments.

According to the results of extraction, the driving situation discretizer module 64 discretizes the driving behavioral data sequences into segmented behavior-data sequences; where each of the segmented behavior-data sequences corresponds to one of the driving situations. The driving situation discretizer module 64 extracts sequence of time sections, each of which matching with a corresponding one of the segmented behavior-data sequences. This is further described in U.S. Pat. No. 9,527,384, which is incorporated herein by reference.

The feature distribution generator module 66 generates a distribution of feature quantities included in each of the segmented behavior-data sequences experienced in each of the driving situations. Similarly, the feature distribution generator module 66 generates a distribution of feature quantities experienced in each of the environmental data sequences output from the environmental-data obtaining module 62 for each of the driving situations. For example, each of the segmented behavior-data sequences may include: a first feature quantity sequence FQ1, which is indicative of a position of a driver-operable gas pedal; a second feature quantity sequence FQ2, which is indicative of a position of a driver-operable brake pedal; a third feature quantity sequence FQ3, which is indicative of a position of a steering wheel; a fourth feature quantity sequence FQ4, which is indicative of a velocity of the vehicle; fifth to seventh feature quantity sequences FQ5 to FQ7, each of which is the sequence of differential quantities of a corresponding one of the first to third feature quantity sequences FQ1 to FQ3; and an eighth feature quantity sequence FQ8, which is the sequence of differential quantities of the fourth feature quantity sequence FQ4. Each of the segmented behavior-data sequences may include sequences for the other parameters and/or features disclosed herein. Each of the first to eighth feature quantity sequences FQ1 to FQ8 has a corresponding range with low and high limits.

The feature distribution generator module 66 uses the ranges of the segmented behavior-data sequences as a corresponding feature space, and generates a distribution for each feature quantity in a corresponding one of the feature spaces. The feature distribution generator module 66 also generates a distribution of feature quantities included in each of the environmental data sequences for each of the driving situations. The feature distribution generator module 66 divides the measured images constituting the time-series image data sequence for each of the driving situations, thus obtaining segmented images corresponding to each of the driving situations.

The feature distribution generator module 66 uses, as target feature quantities, scale-invariant feature transform (SIFT) quantities included in the segmented images for each of the driving situations. The feature distribution generator module 66 obtains SIFT quantities in each local region in each of compressed image as a feature quantity. The feature distribution generator module 66 uses the range of the SIFT quantities as a feature space and generates a distribution of the SIFT quantities in the feature space. The feature distribution generator module 66 generates a bar for each of predetermined bins; the height of the bar for each of the predetermined bins represents the frequency of corresponding some of the SIFT quantities. This generates a distribution of the SIFT quantities as a histogram. The predetermined bins are preferably determined based on learning. The feature distribution generator module 66 can use other feature quantities in place of the SIFT quantities. Accordingly, these operations of the feature distribution generator module 66 generate a group of feature-quantity distributions for each of the driving situations; the group of the feature-quantity distributions for each of the driving situations includes: a first type of feature-quantity distributions based on the segmented behavior-data sequences for a corresponding one of the driving situations; and a second type of feature-quantity distributions based on the time-series environmental data sequences for a corresponding one of the driving situations. This is further described in U.S. Pat. No. 9,527,384, which is incorporated herein by reference.

As an example, the number of the first and second types of feature-quantity distributions included in each of the driving situations may be set to n, where n is an integer equal to or more than 2. The n feature-quantity distributions included in each of the driving situations can be referred to as the first feature-quantity distribution (first distribution) 1, . . . , to the n-th feature-quantity distribution (n-th distribution) n.

First, the modules 60, 62, 64, 66 are operating while the vehicle is travelling. These operations generate learning first to n-th feature-quantity distributions for each of the driving situations; the learning first to n-th feature-quantity distributions for each of the driving situations are correlated with corresponding learning images for a corresponding one of the driving situations. The feature distribution transceiver 68 transmits the group of feature-quantity distributions to the driver risk assessment server 10 of FIG. 1.

Figure 3:
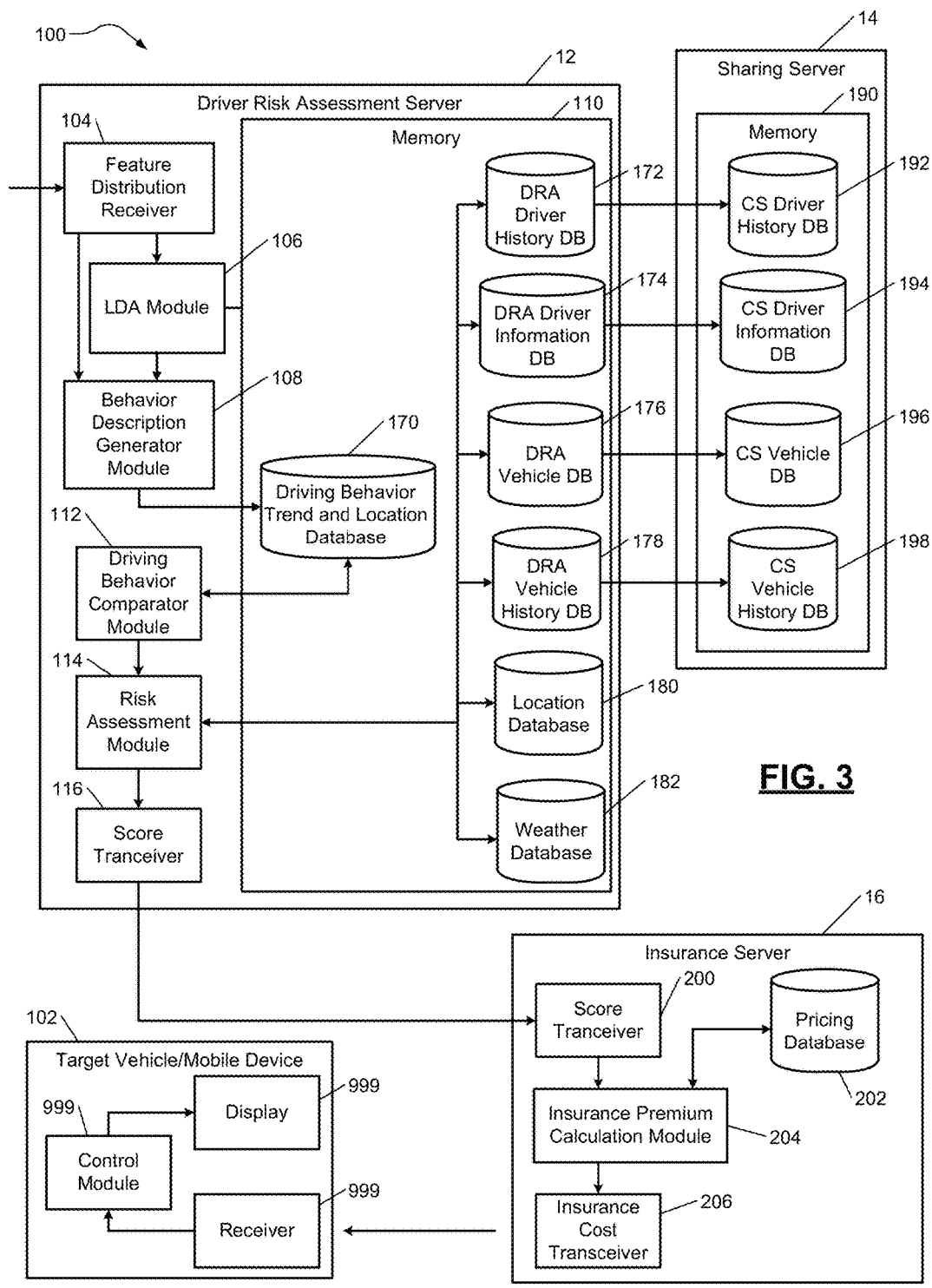
FIG. 3 is a functional block diagram of an example of a portion of the risk assessment system of FIG. 1 including servers in accordance with an embodiment of the present disclosure.

FIG. 3 shows a portion 100 of the driver risk assessment system 10 of FIG. 1. The portion 100 includes the driver risk assessment server 12, the sharing server 14, the insurance server 16 and a target vehicle or mobile device 102. The driver risk assessment server 12 includes a feature distribution receiver 104, a LDA module 106, a behavior description generator module 108, a memory 110, a behavior comparator module 112, a risk assessment module 114, and a score transceiver 116. The modules 106, 108, 112, 114 may be implemented by one or more processors.

The feature distribution receiver 104 receives groups of feature-quantity distributions from the feature distribution transceivers of the vehicles 20, 22. The LDA module 106 determines, based on the groups of feature-quantity distributions, and/or other parameters and/or features received from and/or associated with the vehicles 20, 22, topics. Each of the topics refers to a related group of features that together have a high probability of occurring.

Figure 4:
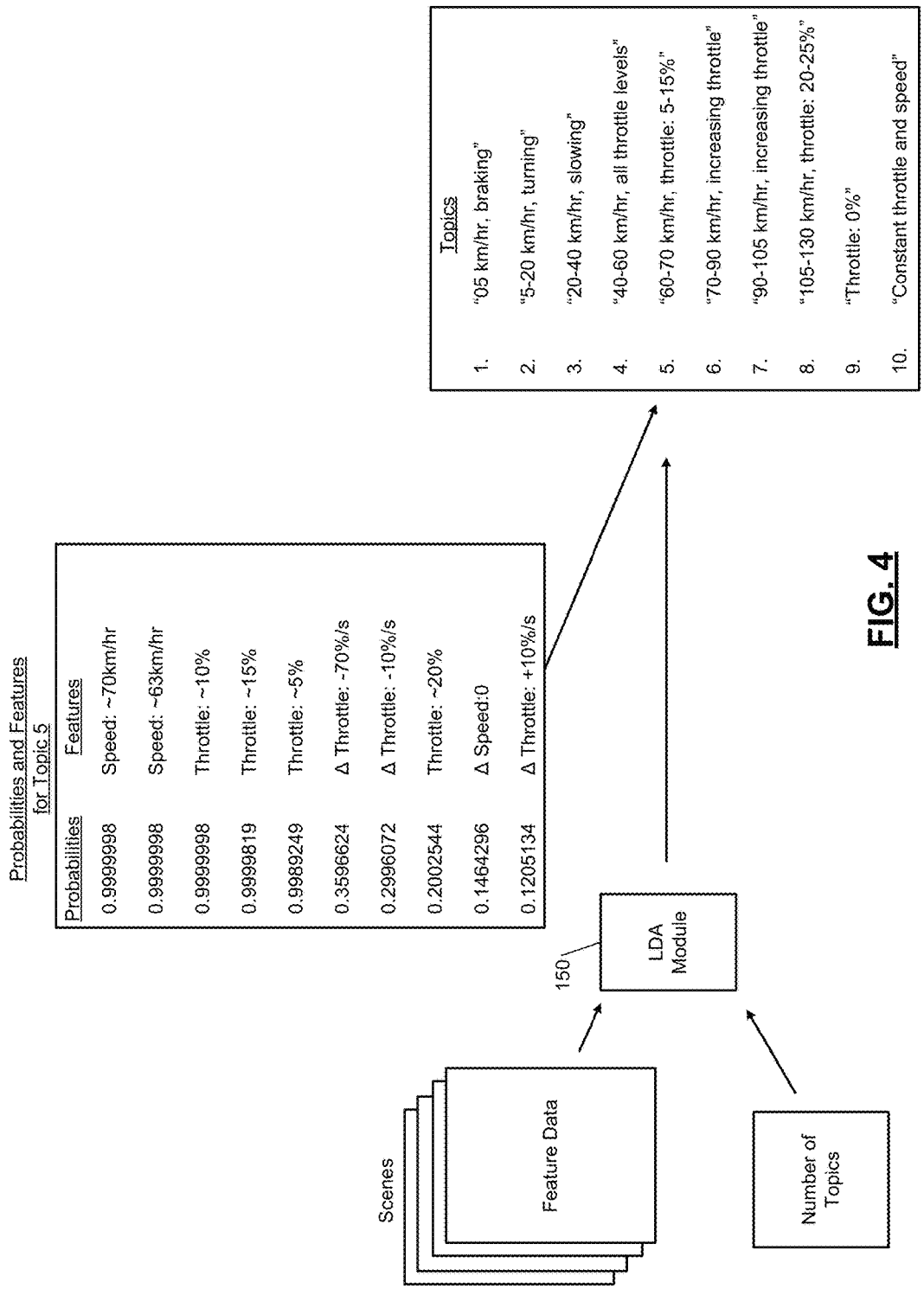
FIG. 4 is an example block diagram illustrating operation of a latent Dirichlet allocation (LDA) module in accordance with an embodiment of the present disclosure.

FIG. 4 shows a LDA module 150 that receives as inputs feature data grouped by scene and a number of topics to be created. A scene may refer to a location, a topic, and a corresponding distribution of topic proportions for that location. Topic proportions refer to the percentage of drivers having a particular behavior that matches the features of one or more topics.

In the example of FIG. 4, the LDA module 150 generates 10 topics. The feature data received by the LDA module may include steering, brake, throttle, and speed data for each of the scenes and for multiple vehicles. A top may be created for features that have a high probability (e.g., greater than a predetermined percentage) of occurring for a scene. As an example, example probabilities and features are shown based on which topic 5 is created. As shown, speeds of 63 and 70 kilometers/hour (km/hr) and throttle positions of 5, 10 and 15% have high probabilities of occurring. The LDA module 150 creates the $5^{th}$ topic to be 60-70 km/hr and throttle position of 5-15%. In a similar manner the LDA module 150 creates the other topics 1-4 and 6-10. The LDA module 150 is further described below with respect to FIG. 6.

Figure 5:
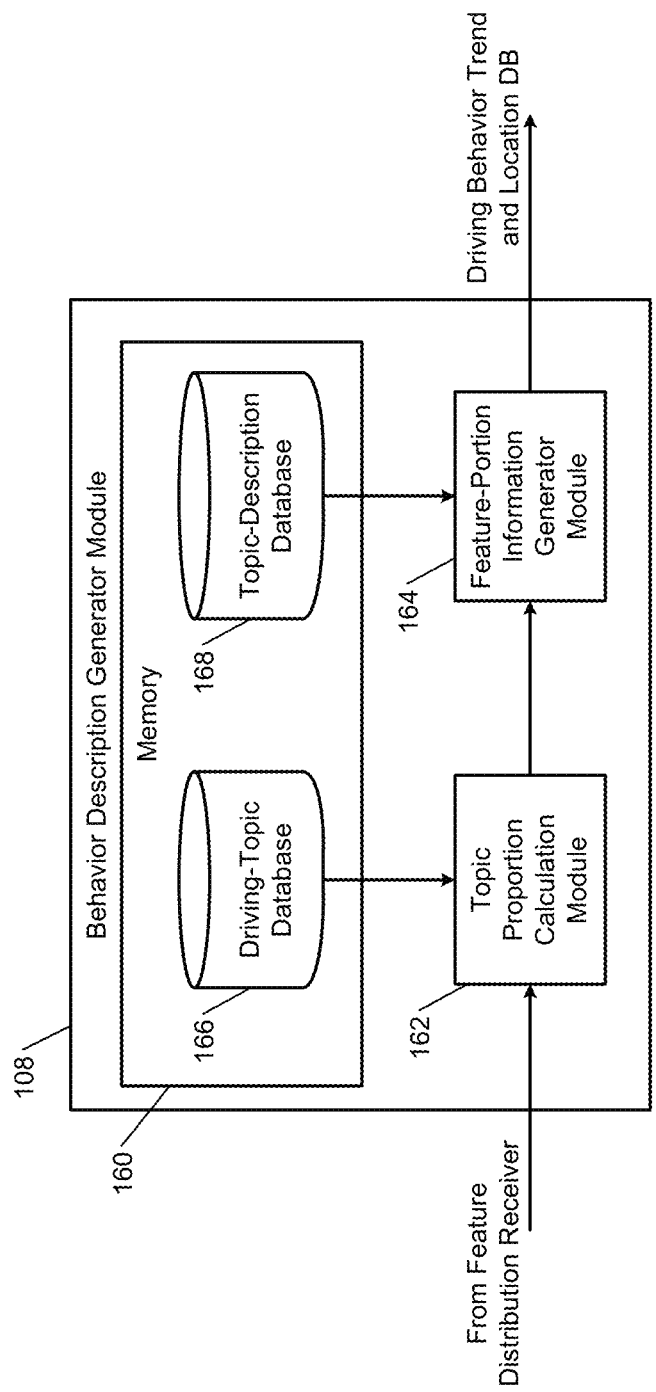
FIG. 5 is a functional block diagram of an example of a behavior description generator module in accordance with an embodiment of the present disclosure.

Referring now to FIGS. 3 and 5, which show the behavior description generator module 108 that includes a memory 160, a topic proportion calculation module 162, and a feature-portion information generator module 164. The memory 160 stores a driving-topic database 166 and a topic-description database 168.

The driving-topic database 166 has stored therein information indicative of the topics. Each of the topics represents a corresponding driving situation that occurs while a vehicle is travelling. Each of the topics is composed of n base feature-quantity distributions, where n the same as the number n of the n feature-quantity distributions included in each of the driving situations described above. The n base feature-quantity distributions can be referred to as the first base feature-quantity distribution (first base distribution) 1, . . . , and the n-th base feature-quantity distribution (n-th base distribution) n. The information of the topics is used to express the group of the first to n-th feature-quantity distributions for each of the driving conditions as a combination of at least some of the topics.

Figure 6:
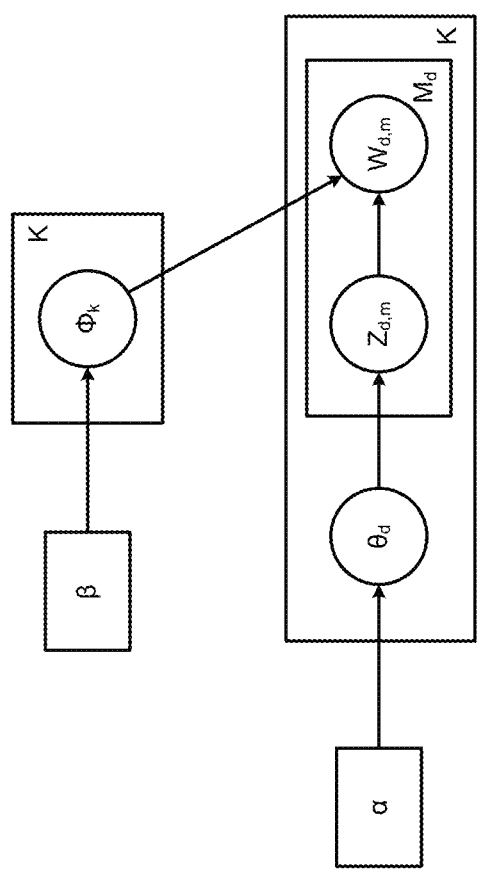
FIG. 6 is a block diagram schematically illustrating an example of a graphical model hypothesized by LDA in accordance with an embodiment of the present disclosure.

The topics may be generated using a latent topic model used in the field of natural language processing where: each of the segmented behavior-data sequences, which corresponds to one of the driving situations, is regarded as one sentence; and measured, i.e. observed feature quantities are regarded as individual words. Each of the topics is based on multiple modalities, i.e. the driving behavioral data sequences and the environmental data sequences. In order to estimate the topics using the n base feature quantity distributions, multimodal LDA can be used as described in U.S. Pat. No. 9,527,384. LDA hypothesizes a graphical model for example as illustrated in FIG. 6. LDA is an algorithm associated with natural language processing. The algorithm takes a set of observations, such as driving scenes, and generates a set of topics to describe the scenes. LDA is an unsupervised generative statistical model. Reference character D represents the number of all the drive situations. Reference character $M_d$ represents the number of image fames included in a d-th driving situation. Reference character d is an identifier of a driving situation in the D driving situations. Reference character K represents the number of topics. Reference character $w_{d,m}$ represents a feature quantity observed, i.e. measured, in an m-th frame of the d-th driving situation. Reference character m represents an identifier of a frame in the $M_d$ frames. Reference character $z_{d,m}$ represents a topic indicator variable indicative of a topic allocated for the feature quantity $w_{d,m}$. The topic indicator variable $z_{d,m}$ takes one of natural numbers 1 to K. Reference character $\theta_d$ represents a multinomial distribution parameter $\theta$ indicative of the ratio of respective topics included in the d-th situation thereamong, and $\phi_k$ represents a multinomial distribution parameter $\phi$ indicative of the ratio of respective feature quantities generated from a k-th topic thereamong. Reference character k represents an identifier of a topic in the K topics. Reference characters $\alpha$ and $\beta$ represent parameters for the respective multinomial distribution parameters $\theta_d$ and $\phi_k$.

The multinomial distribution parameter $\theta_d$, the multinomial distribution parameter $\phi_k$, the topic indicator variable $z_{d,m}$, and the feature quantity $w_{d,m}$ are respectively defined by the following equations (1) to (4), where Dir represents a Dirichlet distribution, and Multi represents a multinomial distribution:

$$\theta_d \sim \text{Dir}(\theta;\alpha) \qquad (1)$$

$$\phi_k \sim \text{Dir}(\phi;\beta) \qquad (2)$$

$$z_{d,m} \sim \text{Mult}(z;\theta_d) \qquad (3)$$

$$w_{d,m} \sim \text{Multi}(w;\phi_{z_{d,m}}) \qquad (4)$$

Using the model illustrated in FIG. 3 in accordance with a known expectation-maximization (EM) algorithm enables the multinomial distribution parameters $\theta$ and $\phi$ to be estimated; the EM algorithm alternates between performing an expectation (E) step, which creates a function for the expectation of the log-likelihood evaluated using the current estimate for the parameters, and a maximization (M) step, which computes parameters maximizing the expected log-likelihood found on the E step. In particular, the topics according to this embodiment are for example generated based on many feature-quantity distributions for learning previously generated.

The multimodal LDA is executed using the generated learning first to n-th feature-quantity distributions for each of the driving situations to enable first to nth topics, each of which including first to n-th base feature quantity distributions that are estimated. As described above, each of the topics based on a corresponding group of the first to n-th base feature quantity distributions set forth above represents a corresponding specific driving situation that latently, i.e. potentially, exists in corresponding driving behavioral data sequences and environmental data sequences, and that frequently appears while a driver is driving the vehicle.

The topic proportion calculation module 162 selects some topics from the topics stored in the driving-topic database 166 for each of the driving situations. The topic proportion calculation module 162 calculates the percentages of each the selected topics with respect to all of the selected topics such that the calculated percentages of the selected topics most suitably expresses the first to n-th feature-quantity distributions included in a corresponding one of the driving situations.

Specifically, the topic proportion calculation module 162 executes only one or more E steps included in the EM algorithm, thus calculating a topic proportion for each of the driving situations. The topic proportion for each of the driving situations represents the percentages of selected topics to the whole of the selected topics for the first to n-th feature-quantity distributions included in a corresponding one of the driving situations.

For example, a topic proportion $\theta_d$ for a d-th driving situation can be expressed by the following equation (5), where $TP_k$ represents a k-th topic $TP_k$ included in a topic proportion $\theta_d$, k represents an identifier of a topic in K topics $TP_1$ to $TP_K$, and $\theta_{d,k}$ represents a content ratio of the k-th topic $TP_k$ in the topic proportion $\theta_d$.

$$\theta_d = (\theta_{d,1}, \theta_{d,2}, \theta_{d,3}, \ldots, \theta_{d,K}) \qquad (5)$$

That is, the topic proportion calculation module 162 calculates the sequence of topic proportions $\theta_d$ of the respective driving situations.

The topic-description database 168 has stored therein driver behavioral descriptions defined to correlate with the respective topics. That is, a typical driving behavior of a driver for each topic is described.

Driver behavioral descriptions for the topics are then generated. First, a driving-topic generation method according to this embodiment uses the first type of feature-quantity distributions included in the first to n-th base feature-quantity distributions constituting each of the topics in order to generate the driver behavioral descriptions for each of the topics. Then, the driving-topic generation method extracts, from the first type of feature-quantity distributions, feature quantities that are specific to each of the topics using a likelihood ratio $L_{i,k}$, thus generating driver behavioral descriptions based on the results of the extraction for each of the topics.

The driving-topic generation method calculates the likelihood ratio $L_{i,k}$ as a driving behavioral feature in accordance with the following equation (6), where: $w_i$ represents feature quantities belonging to an i-th bin; i represents an identifier of a bin included in all the bins; $TP_k$ represents a k-th driving topic identified by k; $\phi_k$ represents a multinomial distribution indicative of the base feature-quantity distributions of the k-th driving topic $TP_k$; $p(w_i|\phi_k)$ represents the conditional probability of the feature quantities $w_i$ given multinomial distribution $\phi_k$ of the k-th driving topic $$TP_k; \sum_k p(w_i|\phi_k)$$

represents a sum of all the conditional probabilities $p(w_i|\phi_k)$ obtained for all the driving topics.

$$L_{i,k} = \frac{p(w_i|\phi_k)}{\sum_k p(w_i|\phi_k)} \qquad (6)$$

The likelihood ratio $L_{i,k}$ defined in the equation (6) is an indicator called an inverse document frequency (IDF), which represents the frequency or the probability of feature quantities, which belong to an i-th bin included in only a specific topic $TP_k$.

The driving-topic generation method extracts primitive behavioral expressions for each of the topics from a predetermined primitive behavioral expression list for each of the topics in accordance with graphs. Each of the graphs shows, for each of the topics, a distribution of the corresponding likelihood ratios $L_{i,k}$ at the respective bins. Then, the driving-topic generation method joins the extracted primitive behavioral expressions for each of the topics appropriately, thus generating a driver behavioral description for each of the topics. These driver behavioral descriptions for the respective topics are stored in the topic description-database 168 to correlate with the respective topics.

The feature-portion information generator module 164 performs a feature-portion information generation routine. The feature-portion information generation routine detects a feature portion in the sequence of the driving situations when there is a significant change of a target driving situation from a latest previous driving situation. Then, the feature-portion information generation routine extracts, from the feature portion, a first driving topic Tpa having a corresponding percentage in the topic proportion for a target driving situation that most significantly changes in percentage of all the topics. Thereafter, the feature-portion information generation routine sets a first topic description defined for the first topic Tpa as the first behavioral description D1.

The feature-portion information generation routine also obtains an average topic proportion 7C based on all driving situations belonging to a stable range defined as a range from a last previous detection time of the feature portion to a current detection time of the feature portion. Then, the feature-portion information generation routine extracts, from the average topic proportion 7C, a second driving topic Tpb that has a maximum percentage if the maximum percentage is greater than the predetermined threshold. Thereafter, the feature-portion information generation routine sets a second topic description defined for the second topic Tpa as the second behavioral description D2.

Following the setting of the first behavioral description D1 and/or second behavioral description D2, the feature-portion information generation routine stores feature-portion information including the first behavioral description D1 and/or second behavioral description D2, the detected time of the corresponding feature portion, and a stable-range length W. feature-portion information generator module 164 may store the behavioral descriptions, feature proportions, and corresponding behavioral trend and location information in the driving behavior trend and location database 170 in the memory 110. The trend information may indicate trends in changes of behavior of drivers for corresponding locations.

The memory 110 may also store a driver risk assessment (DRA) driver history database (DB) 172, a DRA driver information DB 174, a DRA vehicle DB 176, a DRA vehicle history DB 178, a location DB 180 and a weather DB 182. The DRA driver history DB 172 stores features of behaviors of drivers for locations and conditions. The conditions may refer to, for example, weather conditions, traffic conditions, road conditions, etc. The DRA driver information DB 174 stores driver information pertaining to each of the drivers, such as a driver identifier (ID), an address, personal information (e.g., age, sex, and phone number), etc. The DRA vehicle DB 176 includes vehicle information, such as a vehicle serial number, a vehicle make, model and type, etc. The DRA vehicle history DB 178 stores vehicle history data, such as steering angles, throttle positions, brake percentages, acceleration rates, and/or other features for locations and conditions. The location database 180 stores location information, such as type of road, whether the location includes a turn, an on ramp and/or an off ramp, inclination of the road, speed limit, etc. The weather database 182 includes weather information for the locations, such as temperature, percent change of precipitation, average wind speed, etc. The sharing server 14 includes a memory 190 that stores databases, which may correspond to the databases 172, 174, 176, 178, as shown and/or other databases. The memory 190 as shown stores a car-sharing (CS) driver history DB 192, a CS driver information DB 194, a CS vehicle DB 196, and a CS vehicle history DB 198. The databases 192, 194, 196, 198 store similar information as stored in the databases 172, 174, 176, 178. The sharing server 14 may share the information stored in the databases 192, 194, 196, 198 with the DRA server 12 and with other servers, such the servers 16, 18 of FIG. 1.

Figure 13:
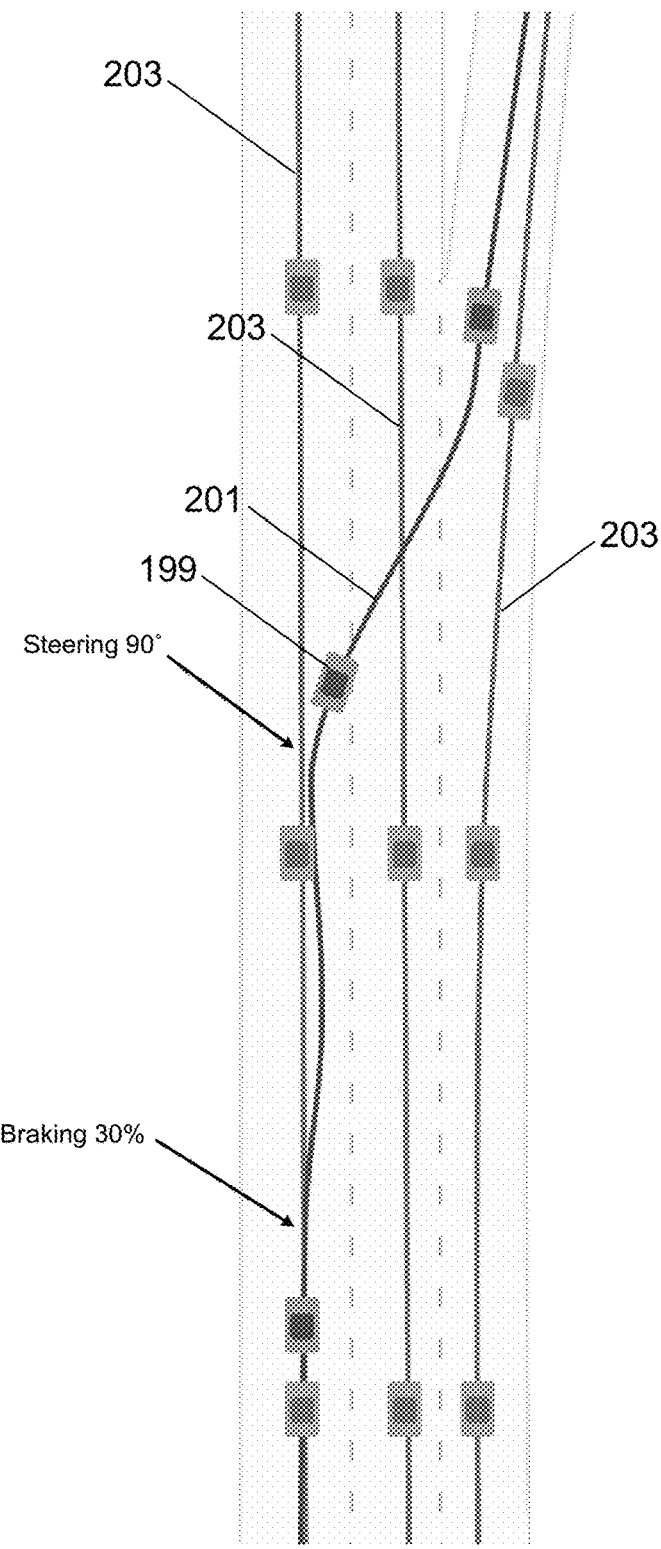
FIG. 13 is an example top view of vehicles illustrating an anomaly of a vehicle at a particular location.

The driving behavior comparator module 112 compares behavior of a driver of a target vehicle with behaviors of drivers of other vehicles to generate anomaly scores. This may be based on the information, including the topic proportions and feature-proportion information, stored in the driving behavior trend and location database 170 by the modules 162, 164. An anomaly, in general, is an action that deviates from what is normal or expected. FIG. 13 shows an example of a driving anomaly, where a vehicle 199 performs a strong braking operation, turns sharply and crosses two lanes of traffic to exit a freeway. FIG. 13 shows a path 201 of the vehicle 199 relative paths 203 of other vehicles. The anomaly scores generated by the driving behavior comparator module 112 indicate whether the driver of the target vehicle is behaving (i) similar or different as the driver has behaved in the past and/or (ii) similar or different than other drivers, when driving in a same location and under similar driving conditions, such as traffic conditions, weather conditions, road conditions, etc.

The risk assessment module 114, based on the anomaly scores generates a risk assessment score. The risk assessment score is indicative of whether the driver is driving (i) safer or more dangerously than the driver has in the past, and/or (ii) safer or more dangerously than other drivers, when driving in a same location and under similar driving conditions. The score transceiver 116 transmits the risk assessment score to, for example, the insurance server 16 as shown and/or to the other server(s) 18, the target vehicle (or mobile device) 102, and/or other server and/or device. The mobile device may be, for example, a computer, a cellular phone, a tablet, a wearable device and/or other electronic device of the driver. The target vehicle and/or mobile device 102 may signal to the driver the risk assessment score.

In the example embodiment shown, the risk assessment score is transmitted to the insurance server 16. The insurance server 16 may include a score transceiver 200, a pricing database 202, an insurance premium calculation module 204 and an insurance cost transceiver 206. The score transceiver 200 receives the risk assessment score from the score transceiver 116. The insurance premium calculation module 204 calculates an insurance premium based on the risk assessment score. This may include looking up an insurance premium in the pricing database 202 based on the risk assessment score. The insurance cost transceiver transmits the updated insurance premium to the target vehicle and/or mobile device to indicate to the driver the updated premium.

Figure 7:
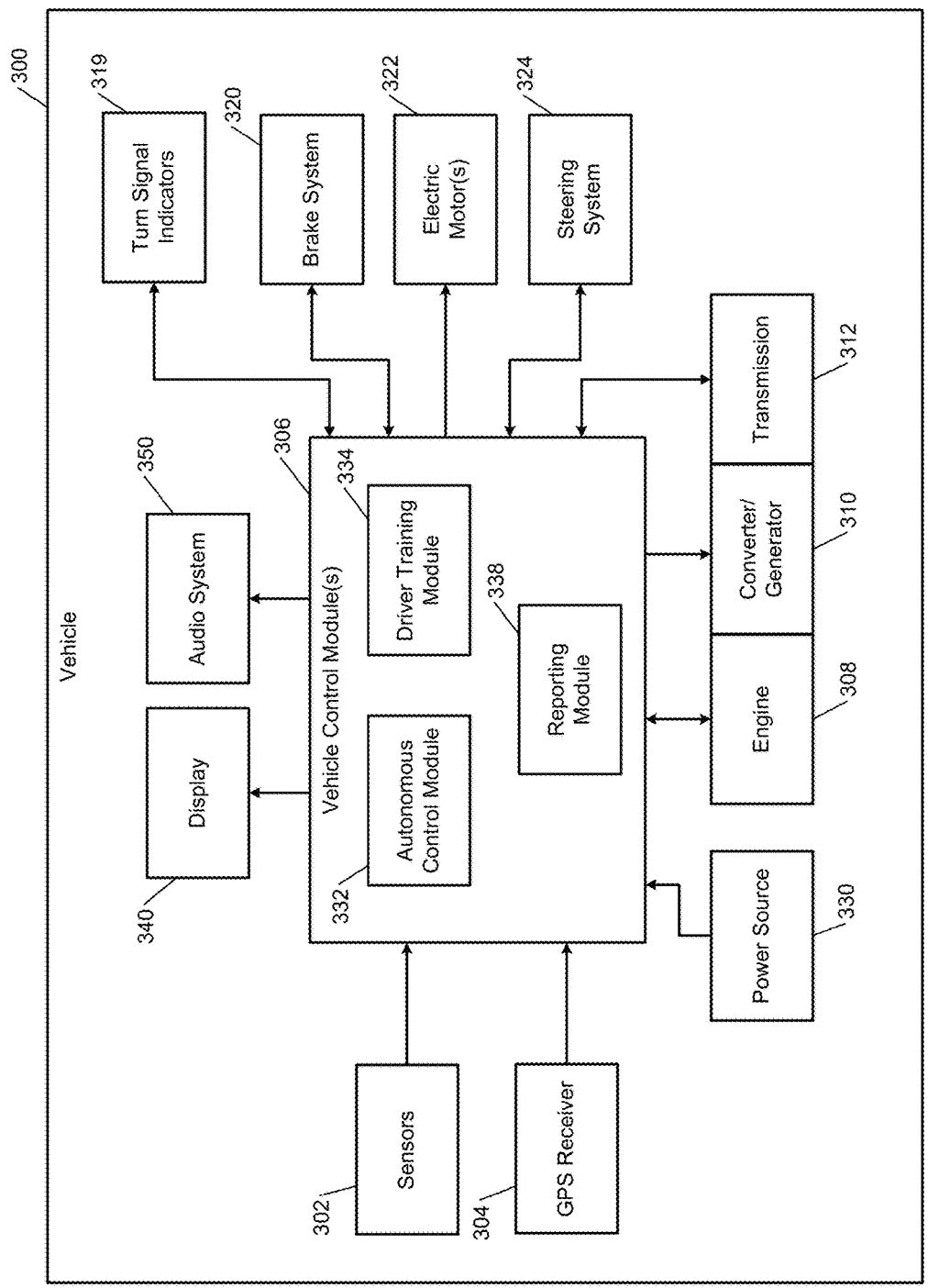
FIG. 7 is a functional block diagram of an example of a vehicle including vehicle control modules in accordance with an embodiment of the present disclosure.

FIG. 7 shows a vehicle 300 including sensors 302, a GPS receiver 304, vehicle control modules 306, an engine 308, a converter/generator 310, and a transmission 312. The vehicle 300 may be implemented as one of the vehicles 20, 22 of FIG. 1. The sensors 302 detect environmental conditions and status of vehicle devices. The sensors 302 may include the sensors 52 of FIG. 2. The GPS receiver 304 may operate similar as the GPS receiver 56 of FIG. 2.

The vehicle control modules 306 may include engine, converter/generator, transmission, brake, steering, electric motor control modules and/or other control modules that control operation of the engine 308, the converter/generator 310, the transmission 312, turn signal indicators 319, a brake system 320, one or more electric motor(s) 322, and steering system 324. The engine 308, the converter/generator 310, the transmission 312, the turn signal indicators 319, the brake system 320, the electric motor(s) 322, and the steering system 324 may include actuators controlled by the vehicle control modules 306 to, for example, adjust fuel, spark, air flow, throttle position, pedal position, etc. This control may be based on the outputs of the sensors 302, the GPS receiver 304, and feedback from the DRA server 12 of FIG. 3. The feedback may include a risk assessment score for a driver of the vehicle 300. The vehicle control modules 306 may receive power from a power source 330, which may be provided to the engine 308, the converter/generator 310, the transmission 312, the turn signal indicators 319, the brake system 320, the electric motor(s) 322, the steering system 324, etc. The other control modules of the vehicle control modules 306 may include an autonomous control module 332, a driver training module 334, and a reporting module 338.

The autonomous control module 332 may control operation of the engine 308, the converter/generator 310, the transmission 312, the turn signal indicators 319, a brake system 320, one or more electric motor(s) 322, and steering system 324 based on average and/or trend driver behavior for locations and conditions. Average and/or trend driver behavior information may be provided by the DRA server 12 of FIG. 3 to the vehicle control modules 306. This may be done via transceivers of the vehicle 300 and the DRA server 12.

As an example, in a certain location and under a certain set of driving conditions, a typical (or average) driver may drive at a certain speed, accelerate at a certain rate, exhibit a certain brake and/or steering pattern, use a certain turn signal, set a certain cruising speed, etc. This and other average driver behavior information may be provided as driving parameters and patterns to each of the vehicle control modules 306, which may then perform tasks based on this information. The average driver behavior information may also include anomaly information and/or anomaly outliers to indicate where potential dangerous conditions exist. Anomaly information and anomaly outliers may be used to identify locations where drivers on average are operating their vehicles more dangerously or differently than under the current driving conditions due to a dangerous situation (e.g., a vehicle accident, an icy road, a down tree or powerline, an inanimate or animate object in a lane of traffic, etc.). An average driver may swerve a corresponding vehicle at a certain location to prevent an accident from occurring. This is an indication of a dangerous location. As another example, the driver of the vehicle 300 may operate the vehicle 300 more dangerously than other drivers at a certain location. As a result, the vehicle control modules 306 may respond to this by changing operation of the engine 308, the converter/generator 310, the transmission 312, the turn signal indicators 319, the brake system 320, the electric motor(s) 322 and/or the steering system 324 and/or by generating, for example, video and/or audio signals via the display 340 and the audio system 350. This may be done in an attempt to alter the behavior of the driver to be similar to that of an average driver.

The autonomous control module 332 may, for example, control operation of the engine 308, the converter/generator 310, the transmission 312, a brake system 320, one or more electric motor(s) 322, and steering system 324, such that the vehicle 300 exhibits these driving parameters and/or follows the provided driving patterns for the current location of the vehicle 300 and driving conditions. This causes the vehicle to operate as a vehicle operated by an average driver for that location and driving conditions. This control may also be based on the anomaly information and/or anomaly outliers.

The driver training module 334 may indicate via a display 340 how to operate the vehicle 300 to a driver to train the driver to act in a similar manner as other typical drivers for that location and driving conditions. The driver training module 334 may receive driving parameters and/or patterns from the DRA server 12 and may then display these parameters and/or patterns on the display 340. For example, prior to entering a location and/or while in the location, the driver training module 334 may display steering indicators, braking indicators, gas pedal indicators, turn signal indicators, driving path indicators, etc. to a driver to influence the driver to act in a certain manner for the current location of the vehicle 300 and driving conditions. The actions performed by the driver training module 334 may also be based on the anomaly information and/or anomaly outliers. The driver training module 334 generator indicators via the display 340 and/or the audio system 350 to indicate to the driver that the driver is driving dangerously and/or appears to be driving impaired and provide indicators to aid the driver to drive more safely. One of the modules 332, 334 may perform countermeasures to avoid an accident by controlling operations of the vehicle 300 should the driver be impaired. This may include limiting speed of the vehicle, reducing speed of the vehicle, maintaining predetermined distances from objects, etc.

The reporting module 338 may display a risk assessment score of the driver as received from the DRA server 12, an updated insurance rate, an updated pay rate, and/or other related information. This may be done via the display 340.

Figure 8:
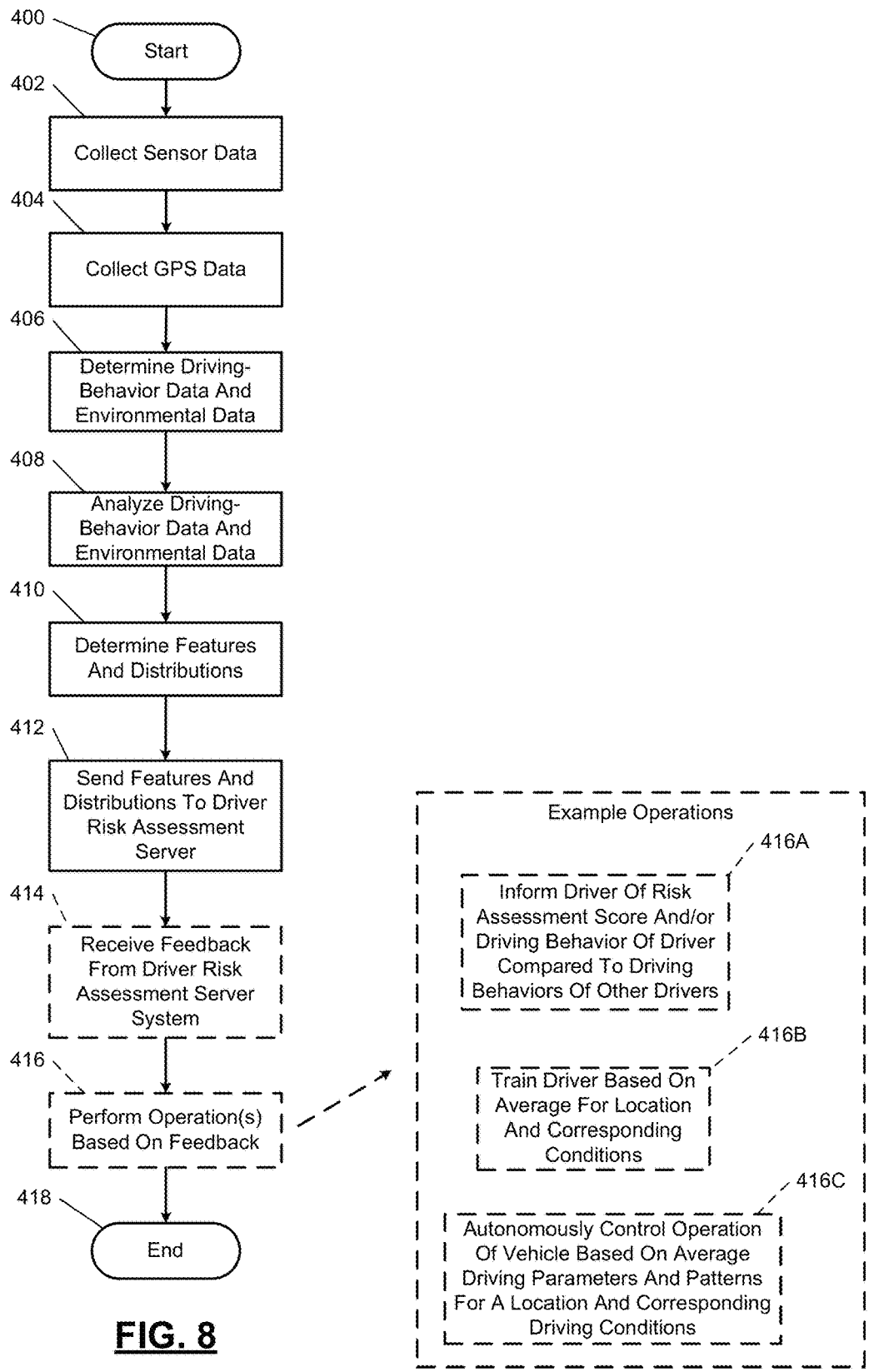
FIG. 8 illustrates an example vehicle reporting and responding method in accordance with an embodiment of the present disclosure.
Figure 9:
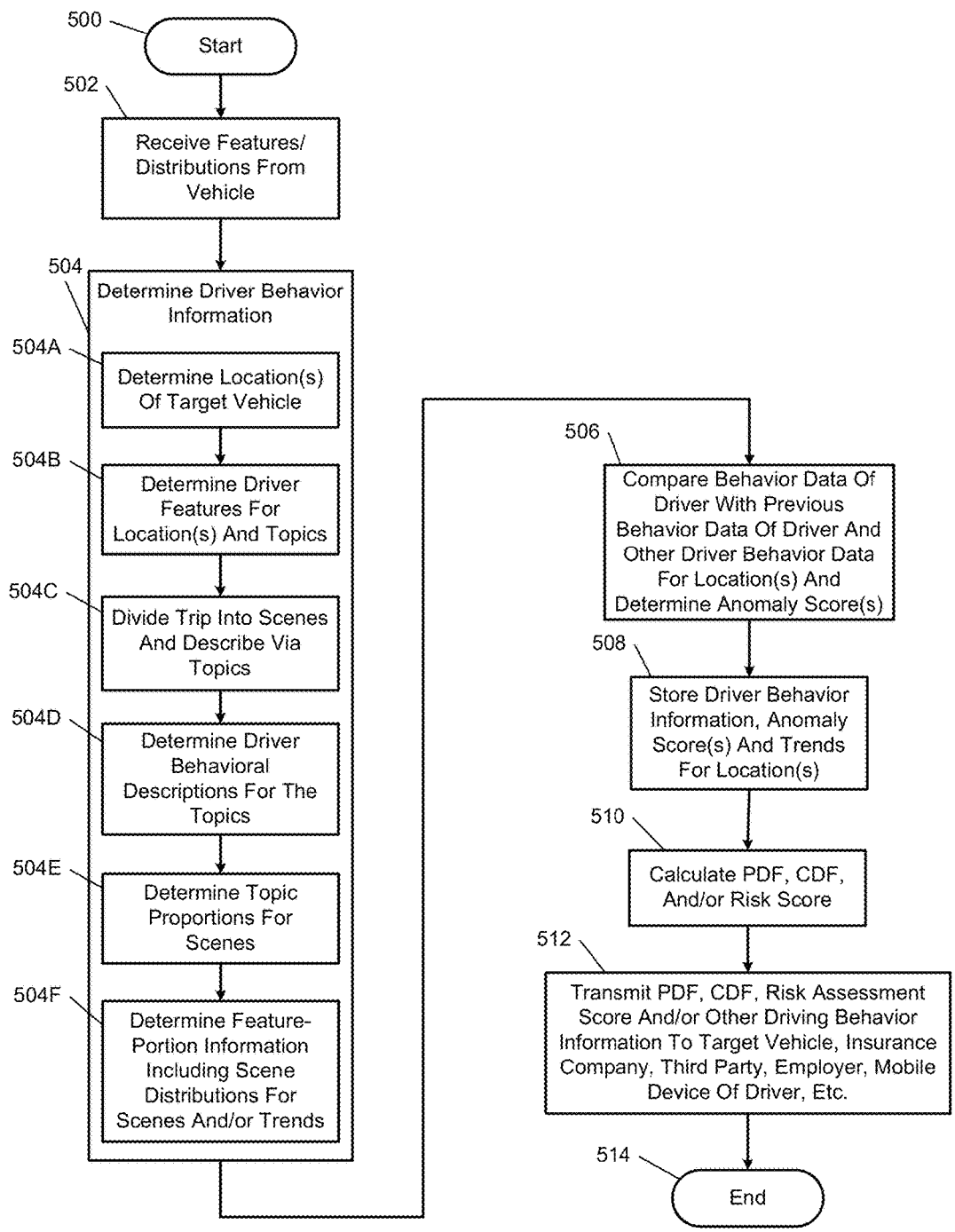
FIG. 9 illustrates an example risk assessment method in accordance with an embodiment of the present disclosure.
Figure 10:
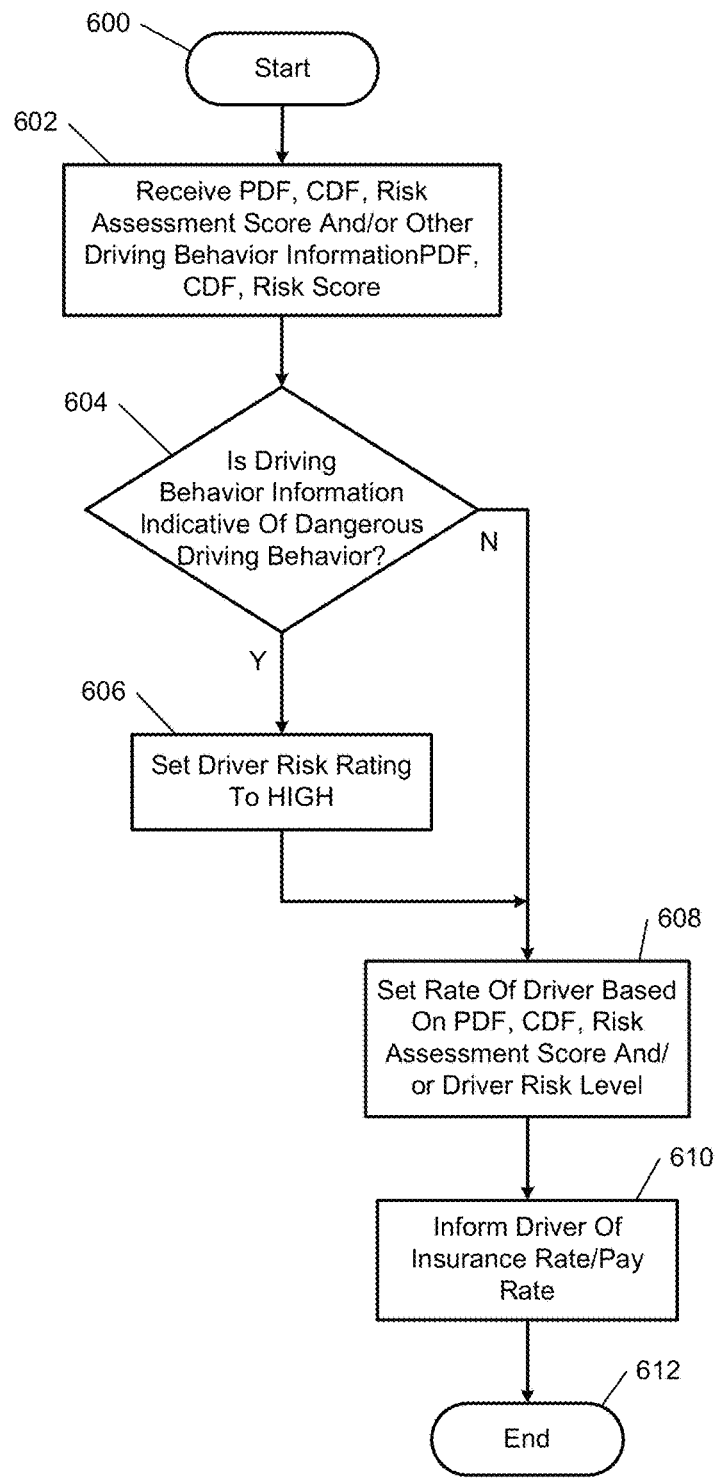
FIG. 10 illustrates an example driver specific scale adjusting method in accordance with an embodiment of the present disclosure.

The systems disclosed herein may be operated using numerous methods, example methods are illustrated in FIGS. 8-10. In FIG. 8, an example vehicle reporting and responding method is shown. Although the following methods are shown as separate methods, one or more methods and/or operations from the separate methods may be combined and performed as a single method. Although the following operations of the following methods are primarily described with respect to the implementations of FIGS. 1-10, the operations may be easily modified to apply to other implementations of the present disclosure. The operations may be iteratively performed.

The method may begin at 400. At 402, the vehicle control modules 54, 306 collect sensor data from the sensors 52, 302. At 404, the vehicle control modules 54, 306 collect GPS data from the GPS receivers 56, 304.

At 406, the data obtaining modules 60, 62 determine driving-behavior data and environmental data as described above with respect to FIG. 2. At 408, the driving situation discretizer module 64 analyzes the driving behavior data and environmental data as described above with respect to FIG. 2. At 410, the feature distribution generator module 66 determines features and distributions as described above with respect to FIG. 2. At 412, the feature distribution transceiver transmits the features and distributions and/or other parameter, location and behavior information to the RDA server 12.

At 414, the feature reporting module 58 and/or one or more of the vehicle control modules 54, 306 may receive feedback from the RDA server 12 and/or from one or more of the servers 16, 18. The feedback may include as described above risk assessment scores, driving parameters and patterns, anomaly information, anomaly outliers, insurance rates, pay rates, etc.

At 416, the vehicle control modules 54, 306, 332, 334, 338 may perform various operations based on the feedback received as described above. Some example operations are shows as operations 416A, 416B, 416C. At 416A, the reporting module 338 may inform the driver of a risk assessment score and/or details regarding a driving behavior of the driver as compared to driving behaviors of other drivers. In another embodiment, the reporting module 338 may also indicate inconsistent driving behavior of the driver and/or indicate when the driver is driving more dangerously. For example, a driver may drive differently for a second trip than the driver did during a first trip, where the same location and similar driving conditions existed for both trips. The driving behaviors may also be for certain times of day and/or dates of the year.

At 416B, the driver training module 334 may attempt to train the driver as described above based on the feedback. At 416C, the autonomous control module 332 may autonomously control operation of the vehicle 50, 300 based on the feedback including, for example, average driving parameters and patterns for the location and driving conditions. The method may end at 418.

FIG. 9 illustrates an example risk assessment method. The method may begin at 500. At 502, the feature distribution receiver 104 receives the features and distributions and/or other parameter and behavior information from the feature distribution transceiver 68. Operation 502 is performed subsequent to operation 412 of FIG. 8.

At 504, the behavior description generator module 108 determines driver behavior information as described above and may include sets of features and/or topics and corresponding distributions and proportions for each driver, trip, scene and location. As an example, at 504A, the behavior description generator module 108 may determine locations of target vehicle through which that target vehicle traveled during a trip. At 504B, the behavior description generator module 108 may determine driver features for the locations and topics. At 504C, the behavior description generator module 108 may implement an algorithm to divide a trip into scenes and describe the scenes via topics. FIG. 14 shows an example of scenes 3-6 and corresponding steering, brake, throttle, and speed behavior information of a driver for each of the scenes at the corresponding locations. Example topic generation is shown and described above with respect to FIG. 4.

At 504D, the behavior description generator module 108 may determine driver behavioral descriptions for the topics. For example, as shown in FIG. 4, for Topic 5, the driver behavioral description is "60-70 km/hr, throttle: 5-15%" for the features of speed being approximately 63 km/hr and 70 km/hr and the throttle positions being approximately 5%, 10% and 15%.

At 504E, the behavior description generator module 108 may determine topic proportions for multiple trips for the scenes by the driver and/or other drivers. FIG. 15 shows example topic proportions for certain scenes. For the example shown, there is a 35% probability that a driver for the location of scene 3 operates a corresponding vehicle at 60-70 km/hr and/or 35% of drivers for the location of scene 3 operate a corresponding vehicle at 60-70 km/hr. For scene 3, there is a 30% probability that for the driver there is a no throttle condition (e.g., the driver has let off a gas pedal). Examples of topic proportions for different trips of an individual scene are shown in FIG. 16. The topic proportions may be for a same driver or for different drivers.

At 504F, the behavior description generator module 108 may determine feature-portion information as described above including scene distributions for the scenes. This may be for a particular location (e.g., location or area 505). For example, multiple trips have occurred for the location 505. The trips have multiple corresponding topics. Trends in behavior are detected for the location, a certain time period, a certain date and/or a set of dates. Continuing from the same example, FIGS. 17-18 show example distributions collectively for the corresponding scenes. The darker shading refers to more recent activity. A couple of trends are identified in FIG. 17 illustrating change in average behavior for a location. FIG. 18 shows probabilities for the features associated with Topic 5, where the features with high probabilities are the most significant features.

At 506, the driver behavior comparator module 112 (i) compares behavior data of the driver with previous behavior data of the same driver, and (ii) compares behavior data of the driver with behavior data of other drivers. This is done for one or more locations. The driver behavior comparator module 112 may generate (i) an anomaly score for the driver as compared to other drivers for each location, and/or (ii) a single anomaly score for the driver as compared to the other drivers for all of the locations.

Figure 19:
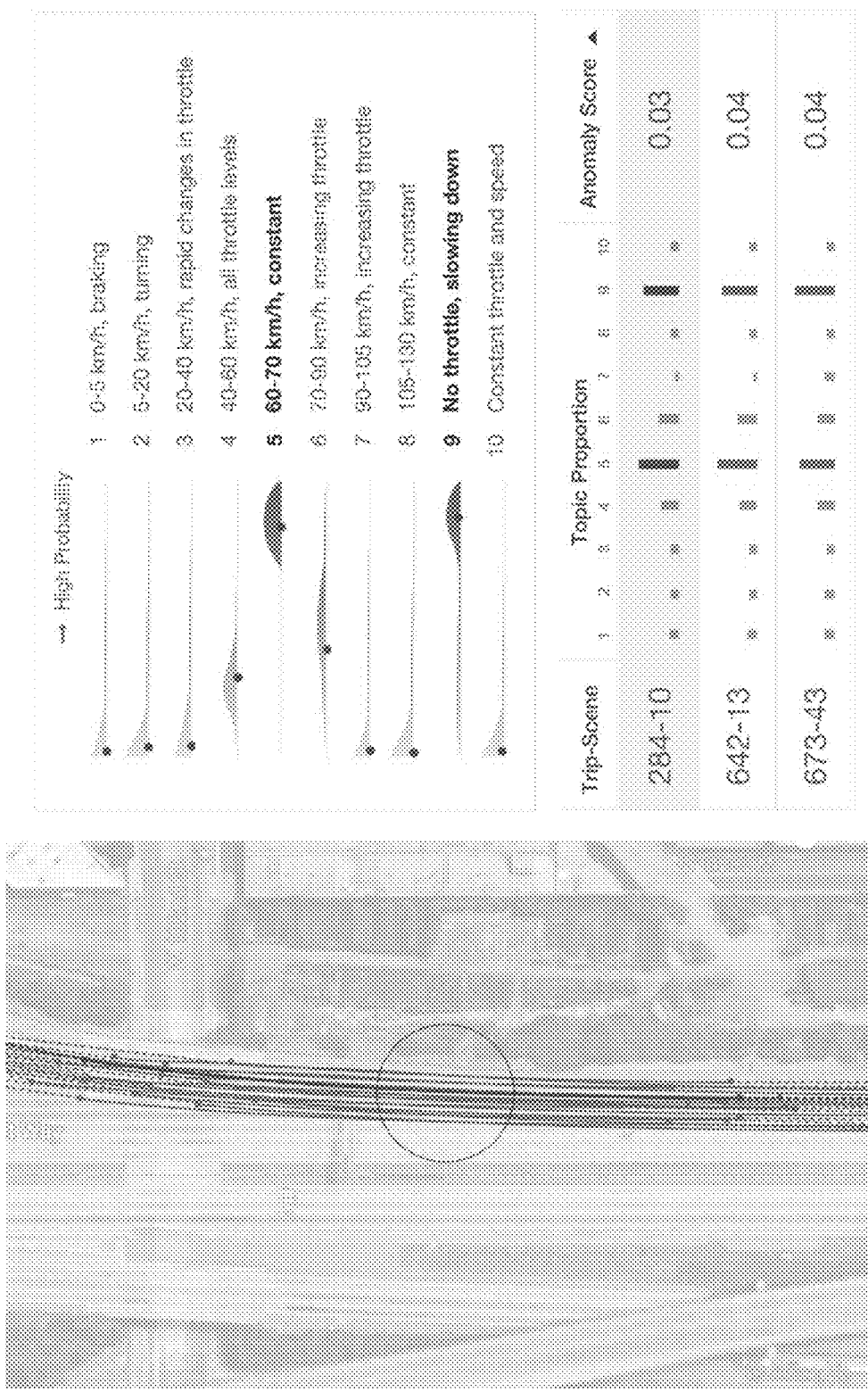
FIG. 19 is a graphical view illustrating example topic proportions and similar anomaly scores for different trips corresponding to the scenes of FIG. 16.

FIG. 19 illustrates an anomaly score for a driver that exhibits similar driving behavior as other drivers. Dots are shown on the distributions of parameter values for multiple trips of the driver. As can be seen, the dots are in regions of the distributions where most other driver parameter values are located and match the trend for the location. As a result, the first anomaly score of 0.03 for the driver is similar to other anomaly scores of average drivers. Two anomaly scores of 0.04 for two other drivers are shown. Each anomaly score is provided for a particular trip and scene and a same location. Example trip and scene numbers are shown for the anomaly scores shown. Example topic proportions are shown for the driver corresponding to each of the anomaly scores. FIG. 19 shows that common scenes match the trend for the location.

FIG. 20 illustrates an anomaly score for a driver that exhibits a different driving behavior than other drivers. Dots are shown on the distributions of parameter values for multiple trips of the driver. As can be seen, some of the dots are not in regions of the distributions where most other driver parameter values are located and thus do not match the trend for the location. As a result, the first anomaly score (e.g., 0.99) of for a first driver is high. Two anomaly scores of 0.97 and 0.92 of other drivers are also provided and indicate that the driving behaviors of these two drivers are also different than driving behaviors of the average driver. In one embodiment, the anomaly scores are normalized to 1.0, such that 0.0 is a minimum score and 1.0 is a maximum score. Thus, the anomaly scores for the three drivers are considered outliers. Each anomaly score is provided for a particular trip and scene and a same location. Example trip and scene numbers are shown for the anomaly scores shown. Example topic proportions are shown for the drivers.

In one embodiment, the driver behavior comparator module 112 determines the anomaly scores by determining a mean distance between a target vehicle trip data and other trip data of the same vehicle and/or other vehicles for the same location. If the anomaly score is low, then there is a low deviation between the target vehicle trip and the other trips. On the other hand, if the anomaly score is high, then there is a high deviation between the target vehicle trip and the other trips. In another embodiment, all trips for the same location and at any time of day and/or date are compared. In yet another embodiment, trips for a same location and similar driving conditions (e.g., weather, time of day, day of week, holiday, etc.) are compared.

At 508, the driver behavior comparator module 112 stores driver behavior information and the anomaly scores for the corresponding locations and trend information in the driving behavior trend and location database 170. This may include the vehicle driver behavior information for each location and for each driver.

Figure 11:
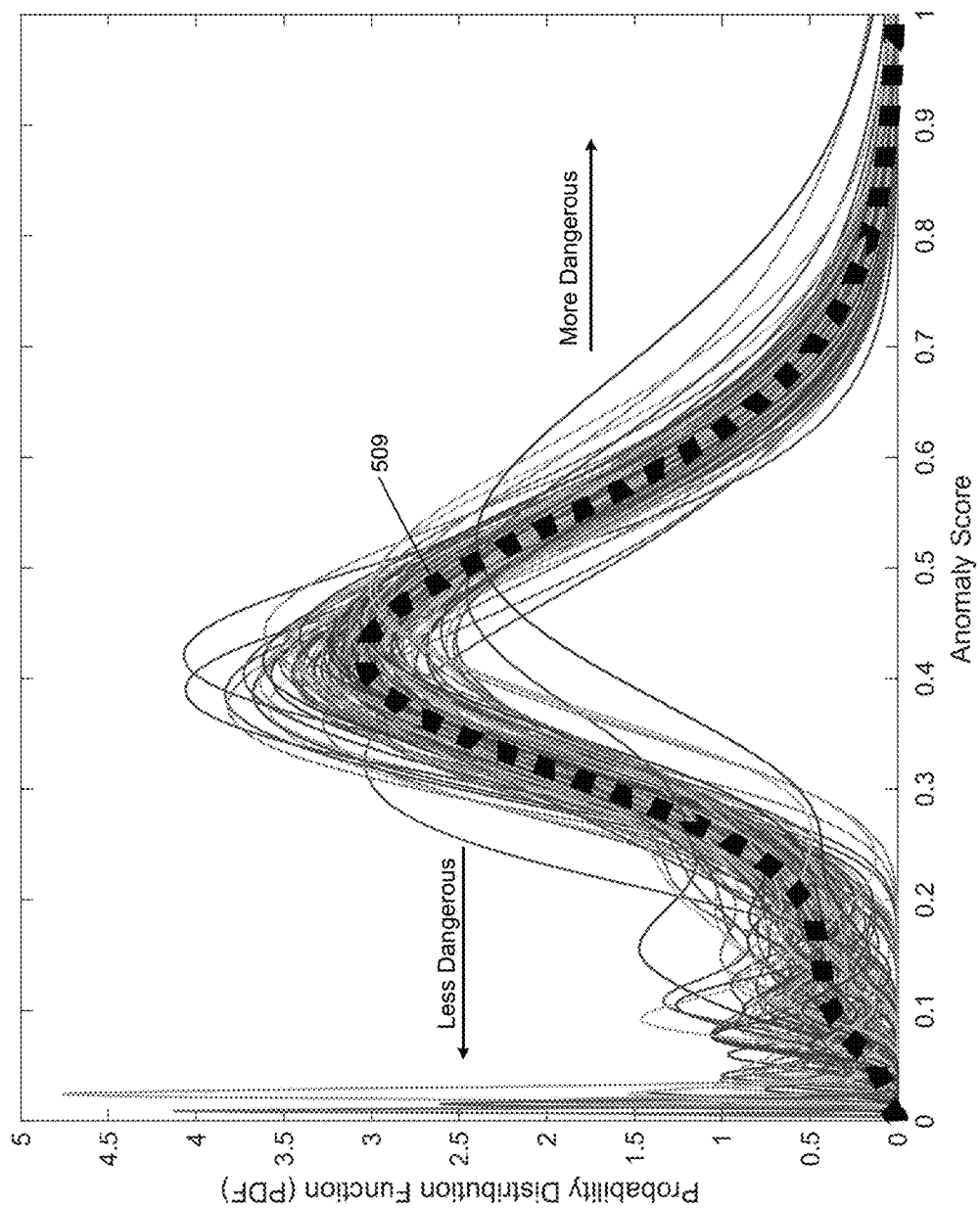
FIG. 11 is a plot of an example of probability distribution functions for multiple drivers.
Figure 12:
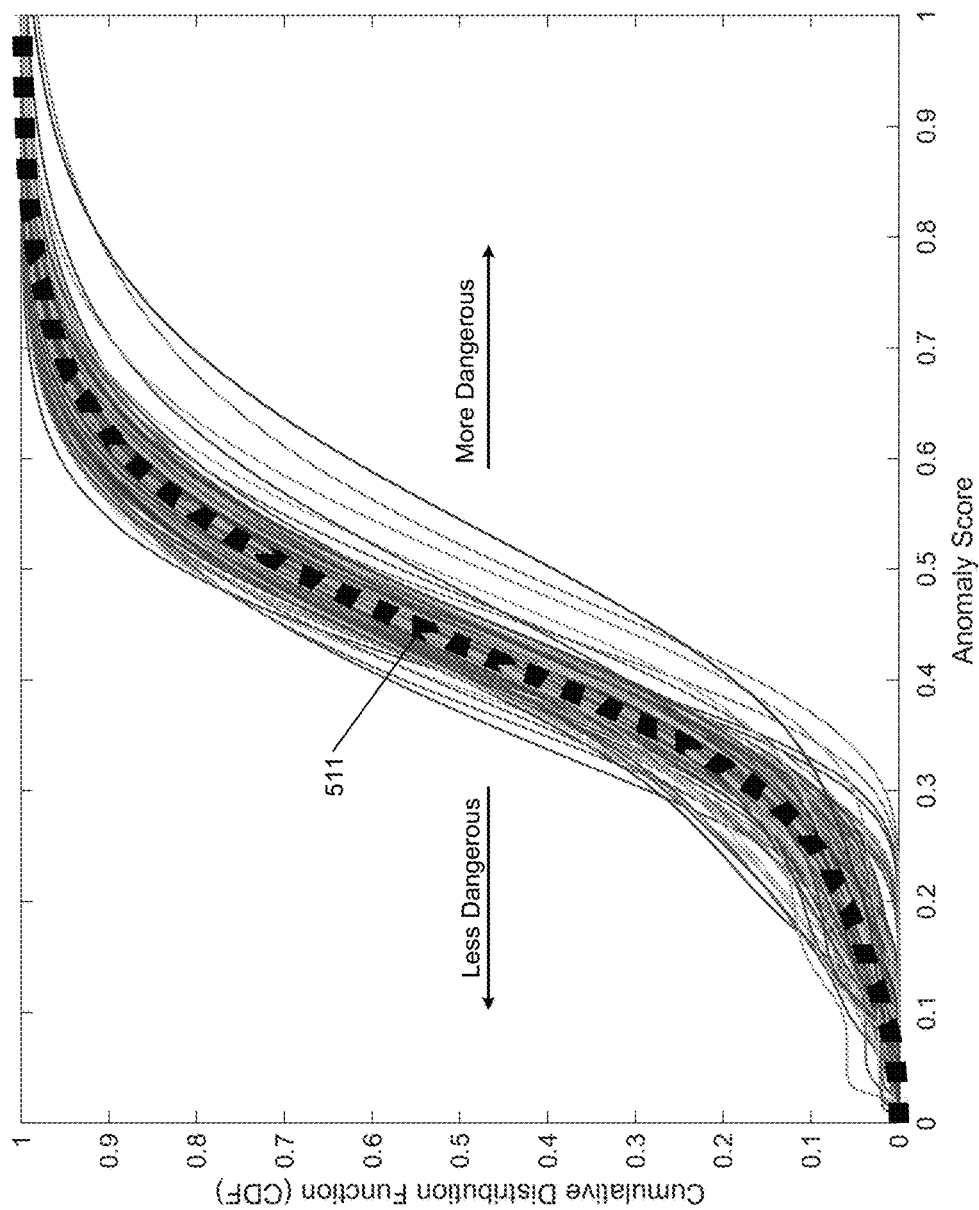
FIG. 12 is a plot of an example of cumulative distribution functions for multiple drivers.

At 510, the risk assessment module 114 calculates a risk assessment score. This may include calculating probability distribution functions (PDFs) and/or cumulative distribution functions (CDFs) for each of multiple drivers based on the anomaly scores for the drivers. Each driver has an anomaly trend for the locations. Each PDF, or density of a continuous random variable (i.e. anomaly score), is a function whose value at any given sample (or point) in a sample space (a set of possible values taken by the random variable) can be interpreted as providing a relative likelihood that the value of the random variable would equal that sample. Each CDF is a probability that an anomaly score will take a value less than or equal to a certain anomaly score. Example PDFs are shown in FIG. 11 and example CDFs are shown in FIG. 12, where an average of the PDFs and an average of the CDFs are identified respectively by boxed curves 509, 511. The PDFs and CDFs that have values to the left of corresponding values of the average PDF and average CDF are for drivers with less dangerous driving behavior. The PDFs and CDFs that have values to the right of corresponding values of the average PDF and average CDF are for drivers with more dangerous driving behavior. The risk assessment score for a driver may be based on the relative difference between the PDF and/or CDF and the average PDF and average CDF. The drivers with PDFs and CDFs to the right of the average PDF and the average CDF are identified as having high risk driving behavior.

If a first location has many corresponding outlier anomaly scores as compared to other locations, then the first location is identified as a dangerous location. As a result, the risk assessment score may be adjusted to account for one or more locations being identified as dangerous. If a location is identified as being a dangerous location then the risk assessment score may be reduced to indicate that the driver is not driving dangerously as compared to other drivers. If a first driver has many outlier anomaly scores as compared to other drivers, then the first driver is identified as a bad, risky and/or dangerous driver. If the driving behavior of a driver has many corresponding outlier anomaly scores as compared to previous driving behavior of the driver, then the driver is deemed to be driving dangerously. The risk assessment score of a driver may be adjusted based in the identification of the driver as being a bad, risk and/or dangerous driver. The risk assessment score may also be based on: whether the driver is having more outlier anomaly events than other drivers for the same locations and driving conditions; whether the driver is having an isolated outlier anomaly event; and whether the driver is having a same or similar outlier anomaly event(s) as other drivers.

At 512, the score transceiver 116 transmits the risk assessment score, the PDF, the CDF, the average PDF, the average CDF, the anomaly scores and/or other behavioral information to the target vehicle, an insurance server, a fleet management server, a third party, an employer, a mobile device of the driver, etc. The method may end at 514.

FIG. 10 illustrates an example driver specific scale adjusting method. The method may begin at 600. At 602, a server, such as one of the servers 16, 18 receives the PDF, the CDF, the average PDF, the average CDF, the anomaly scores and/or other behavioral information associated with a driver. At 604, the server and/or a calculation module (e.g., the calculation module 204) of the server may determine whether the driving behavior is dangerous. If yes, then operation 606 may be performed and the driver may be identified as a high risk driver. In another embodiment, a risk level is assigned to the driver based on the driving behavior information.

At 608, the server and/or the calculation module determines whether the driving behavior of the driver warrants an adjustment in a current rate (e.g., an insurance rate, a pay rate, or other rate) and adjusts the rate accordingly. Behavior-based insurance (BBI) rewards good driver behavior. An insurance rate may be adjusted based on how the driver is performing as compared to other drivers.

The above-described operations of FIGS. 8-10 are meant to be illustrative examples; the operations may be performed sequentially, synchronously, simultaneously, continuously, during overlapping time periods or in a different order depending upon the application. Also, any of the operations may not be performed or skipped depending on the implementation and/or sequence of events.

Figure 21:
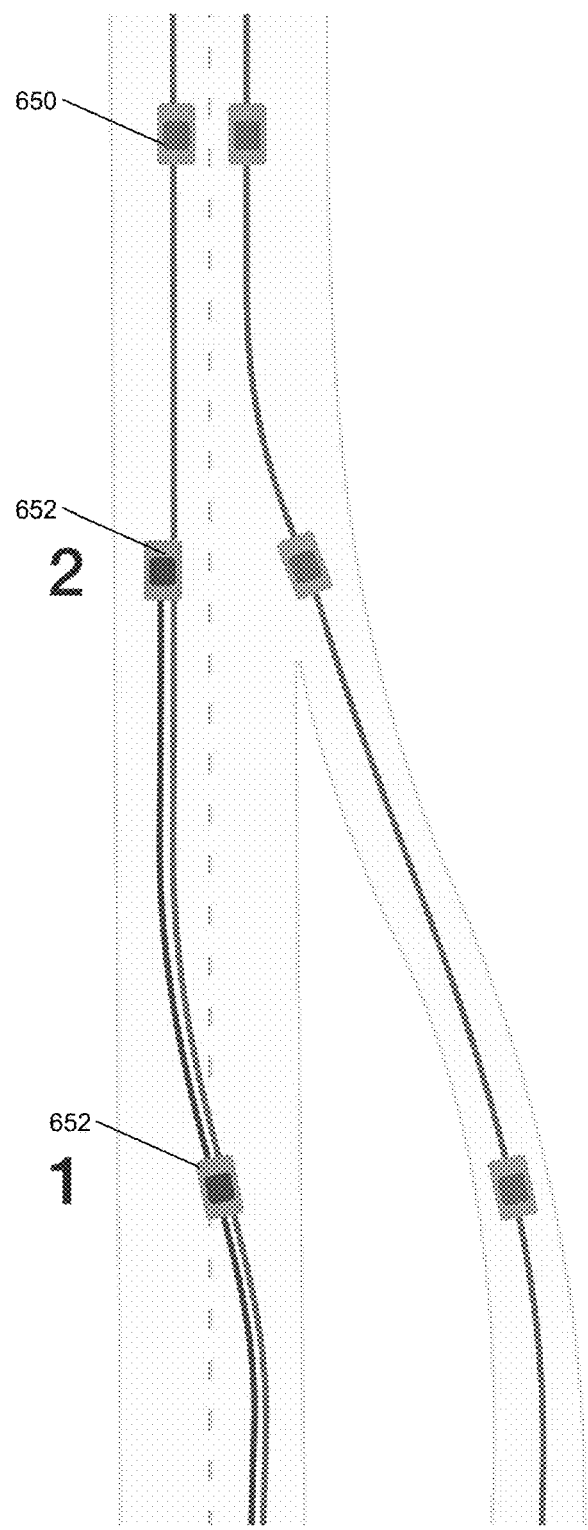
FIG. 21 is an example top view of vehicles illustrating common lane transitioning behavior at a particular location.
Figure 22:
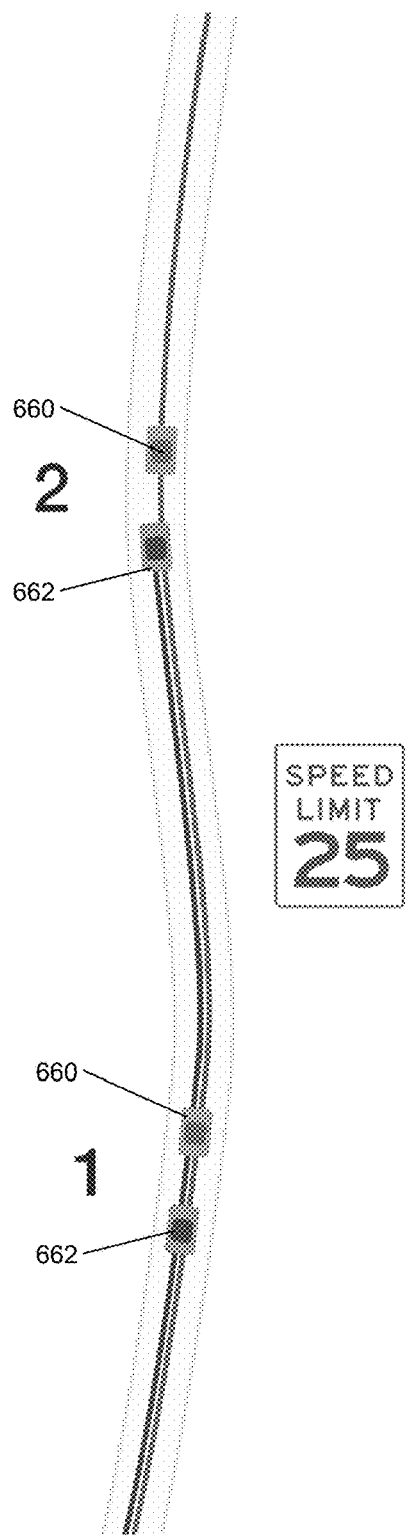
FIG. 22 is an example top view of vehicles illustrating common speed behavior at particular locations.

The following FIGS. 21-22 provide additional examples that may be implemented by the modules and systems disclosed herein. FIG. 21 shows an example top view of vehicles illustrating common lane transitioning behavior at a particular location. In this example, there is a merge ahead for the vehicles. A common trend is for drivers to transition to a left lane early of the merge to provide room for vehicles merging in a right lane. This is shown by common vehicle 650 transitioning at location 1 to the left lane and completing the transition prior to being at location 2. By matching this behavior at this location, an autonomous (or target) vehicle 652 drives in a more natural manner.

FIG. 22 shows an example top view of vehicles illustrating common speed behavior at particular locations. At location 1, vehicles commonly drive 5 mph above a speed limit, but at location 2 vehicles drive at the speed limit because local drivers know that the speed limit is strictly enforced. This is shown by common vehicle 660. An autonomous (or target) vehicle 662 is safer by behaving similarly as other common vehicles and avoids a speeding ticket.

Figure 23:
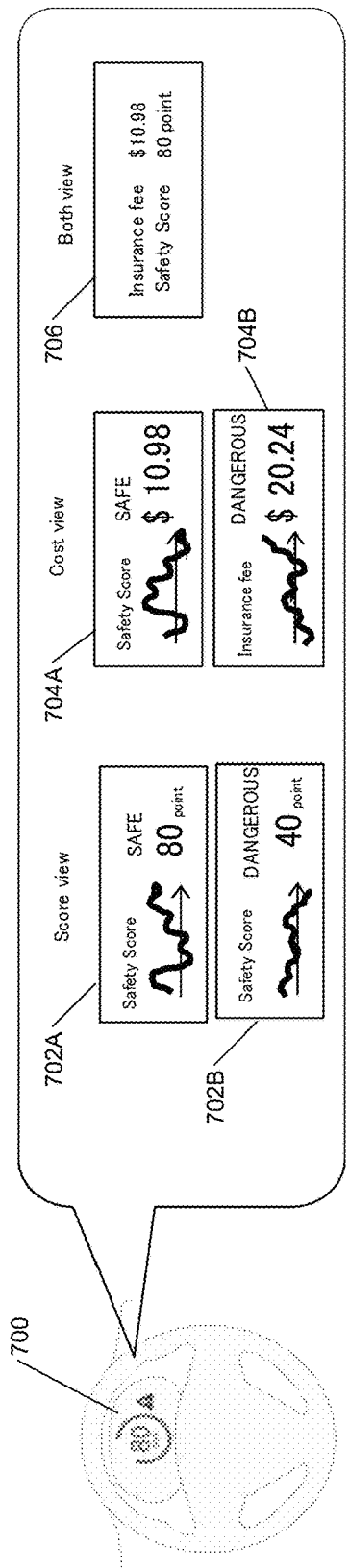
FIG. 23 is an example display reporting driving behavior information in accordance with an embodiment of the present disclosure.

FIG. 23 shows an example display 700 reporting driving behavior information. The driving behavior information may include as shown a plot 702 of the driver's safety score, a plot 704 of the driver's insurance cost, and/or a current insurance fee and safety score window 706. Example plots are shown for a safe driver and a more dangerous driver and designated 702A, 702B, 704A, 704B. The plots and window may be shown on the display 700.

The foregoing description is merely illustrative in nature and is in no way intended to limit the disclosure, its application, or uses. The broad teachings of the disclosure can be implemented in a variety of forms. Therefore, while this disclosure includes particular examples, the true scope of the disclosure should not be so limited since other modifications will become apparent upon a study of the drawings, the specification, and the following claims. It should be understood that one or more steps within a method may be executed in different order (or concurrently) without altering the principles of the present disclosure. Further, although each of the embodiments is described above as having certain features, any one or more of those features described with respect to any embodiment of the disclosure can be implemented in and/or combined with features of any of the other embodiments, even if that combination is not explicitly described. In other words, the described embodiments are not mutually exclusive, and permutations of one or more embodiments with one another remain within the scope of this disclosure.

Spatial and functional relationships between elements (for example, between modules, circuit elements, semiconductor layers, etc.) are described using various terms, including "connected," "engaged," "coupled," "adjacent," "next to," "on top of," "above," "below," and "disposed." Unless explicitly described as being "direct," when a relationship between first and second elements is described in the above disclosure, that relationship can be a direct relationship where no other intervening elements are present between the first and second elements, but can also be an indirect relationship where one or more intervening elements are present (either spatially or functionally) between the first and second elements. As used herein, the phrase at least one of A, B, and C should be construed to mean a logical (A OR B OR C), using a non-exclusive logical OR, and should not be construed to mean "at least one of A, at least one of B, and at least one of C."

In the figures, the direction of an arrow, as indicated by the arrowhead, generally demonstrates the flow of information (such as data or instructions) that is of interest to the illustration. For example, when element A and element B exchange a variety of information but information transmitted from element A to element B is relevant to the illustration, the arrow may point from element A to element B. This unidirectional arrow does not imply that no other information is transmitted from element B to element A. Further, for information sent from element A to element B, element B may send requests for, or receipt acknowledgements of, the information to element A.

In this application, including the definitions below, the term "module" or the term "controller" may be replaced with the term "circuit." The term "module" refers to: an Application Specific Integrated Circuit (ASIC); a digital, analog, or mixed analog/digital discrete circuit; a digital, analog, or mixed analog/digital integrated circuit; a combinational logic circuit; a field programmable gate array (FPGA); a processor circuit (shared, dedicated, or group) that executes code; a memory circuit (shared, dedicated, or group) that stores code executed by the processor circuit; other suitable hardware components that provide the described functionality; or a combination of some or all of the above, such as in a system-on-chip.

The module may include one or more interface circuits. In some examples, the interface circuits may include wired or wireless interfaces that are connected to a local area network (LAN), the Internet, a wide area network (WAN), or combinations thereof. The functionality of any given module of the present disclosure may be distributed among multiple modules that are connected via interface circuits. For example, multiple modules may allow load balancing. In a further example, a server (also known as remote, or cloud) module may accomplish some functionality on behalf of a client module.

The term code, as used above, may include software, firmware, and/or microcode, and may refer to programs, routines, functions, classes, data structures, and/or objects. The term shared processor circuit encompasses a single processor circuit that executes some or all code from multiple modules. The term group processor circuit encompasses a processor circuit that, in combination with additional processor circuits, executes some or all code from one or more modules. References to multiple processor circuits encompass multiple processor circuits on discrete dies, multiple processor circuits on a single die, multiple cores of a single processor circuit, multiple threads of a single processor circuit, or a combination of the above. The term shared memory circuit encompasses a single memory circuit that stores some or all code from multiple modules. The term group memory circuit encompasses a memory circuit that, in combination with additional memories, stores some or all code from one or more modules.

The term memory circuit is a subset of the term computer-readable medium. The term computer-readable medium, as used herein, does not encompass transitory electrical or electromagnetic signals propagating through a medium (such as on a carrier wave); the term computer-readable medium may therefore be considered tangible and non-transitory. Non-limiting examples of a non-transitory, tangible computer-readable medium are nonvolatile memory circuits (such as a flash memory circuit, an erasable programmable read-only memory circuit, or a mask read-only memory circuit), volatile memory circuits (such as a static random access memory circuit or a dynamic random access memory circuit), magnetic storage media (such as an analog or digital magnetic tape or a hard disk drive), and optical storage media (such as a CD, a DVD, or a Blu-ray Disc).

The apparatuses and methods described in this application may be partially or fully implemented by a special purpose computer created by configuring a general purpose computer to execute one or more particular functions embodied in computer programs. The functional blocks, flowchart components, and other elements described above serve as software specifications, which can be translated into the computer programs by the routine work of a skilled technician or programmer.

The computer programs include processor-executable instructions that are stored on at least one non-transitory, tangible computer-readable medium. The computer programs may also include or rely on stored data. The computer programs may encompass a basic input/output system (BIOS) that interacts with hardware of the special purpose computer, device drivers that interact with particular devices of the special purpose computer, one or more operating systems, user applications, background services, background applications, etc.

The computer programs may include: (i) descriptive text to be parsed, such as HTML (hypertext markup language), XML (extensible markup language), or JSON (JavaScript Object Notation) (ii) assembly code, (iii) object code generated from source code by a compiler, (iv) source code for execution by an interpreter, (v) source code for compilation and execution by a just-in-time compiler, etc. As examples only, source code may be written using syntax from languages including C, C++, C#, Objective-C, Swift, Haskell, Go, SQL, R, Lisp, Java®, Fortran, Perl, Pascal, Curl, OCaml, Javascript®, HTML5 (Hypertext Markup Language 5th revision), Ada, ASP (Active Server Pages), PHP (PHP:

Hypertext Preprocessor), Scala, Eiffel, Smalltalk, Erlang, Ruby, Flash®, Visual Basic®, Lua, MATLAB, SIMULINK, and Python®.

None of the elements recited in the claims are intended to be a means-plus-function element within the meaning of 35 U.S.C. § 112(f) unless an element is expressly recited using the phrase "means for," or in the case of a method claim using the phrases "operation for" or "step for."

What is claimed is:

1. A risk assessment system comprising:
   a behavior description generator module configured to at a risk assessment server receive a first set of driving features and topics corresponding to a driving behavior of a first driver of a first vehicle in a location and under a first set of driving conditions;
   a driving behavior comparator module configured to (i) compare the first set of driving features and the topics to one or more other sets of features and topics, wherein the one or more other sets of features and topics correspond to driving behaviors of other drivers for the location and same or similar driving conditions as the first set of driving conditions, and (ii) generate an anomaly score for the first driver based on results of the comparison;
   a risk assessment module configured to calculate a risk assessment score for the first driver based on the anomaly score, wherein the risk assessment score is indicative of a risk level of the first driver relative to the other drivers; and
   a transceiver configured to transmit the risk assessment score from the risk assessment server to at least one of a vehicle control module of the first vehicle or a second server, wherein the risk assessment server and the second server are separate from the first vehicle.

2. The risk assessment system of claim 1, wherein the risk assessment module is configured to calculate the risk assessment score based on a plurality of anomaly scores of the first driver and anomaly scores of the other drivers.

3. The risk assessment system of claim 1, wherein:
   the driving behavior comparator module is configured to generate a plurality of anomaly scores for the first driver; and
   the risk assessment module is configured to (i) based on the plurality of anomaly scores, determine at least one of a probability distribution function or a cumulative distribution function, (ii) compare the at least one of the probability distribution function or the cumulative distribution function to at least one of an average probability distribution function or an average cumulative distribution function, and (iii) calculate the risk assessment score based on the comparison between the at least one of the probability distribution function or the cumulative distribution function for the first driver to the at least one of the average probability distribution function or the average cumulative distribution function.

4. The risk assessment system of claim 1, wherein:
   the driving behavior comparator module is configured to compare the features and the topics corresponding to the driving behavior of the first driver to past features and topics corresponding to past driving behaviors of the first driver, and indicate whether the first driver is driving more dangerously than in the past; and
   the risk assessment module is configured to calculate the risk assessment score based on the indication of whether the first driver is driving more dangerously than in the past.

5. The risk assessment system of claim 1, wherein the risk assessment module is configured to:
   compare the anomaly score for the first driver for a first trip at the location to other anomaly scores for other trips at the location;
   determine whether the anomaly score for the first driver is an outlier as compared to the other anomaly scores; and
   based on whether the anomaly score for the first driver is an outlier, (i) determine a new common driving behavior for the first driver and the other drivers, or (ii) determine that the first driver is driving more dangerously than in the past.

6. The risk assessment system of claim 1, further comprising the second server, wherein the second server is configured to, based on the risk assessment score, adjust an insurance rate or a pay rate of the first driver.

7. The risk assessment system of claim 1, further comprising a latent Dirichlet allocation module configured to determine the topics based on probabilities of the features.

8. The risk assessment system of claim 1, wherein the driving behavior comparator module is configured to (i) determine topic proportions for scenes of one or more trips of the first driver, (ii) based on the topic proportions, determine whether the driving behavior of the first driver matches an average or trending driving behavior of the other drivers, and (iii) generate the anomaly score for the first driver based on whether the driving behavior of the first driver matches the average or trending driving behavior of the other drivers.

9. The risk assessment system of claim 1, wherein the driving behavior comparator module is configured to:
   divide a trip of the first driver into a plurality of scenes;
   describe the scenes via the topics of the first set of driving features and topics;
   determine topic proportions for the plurality of scenes;
   determine feature-proportion information for the plurality of scenes or trends in the driving behavior of the first driver and driving behaviors of the other drivers; and
   generate at least the anomaly score for the first driver based on the topic proportions and feature-proportion information.

10. The risk assessment system of claim 1, further comprising a feature-portion information generator module configured to determine a driving behavior trend based on driving behavior descriptions, wherein:
    the behavior description generator module is configured to (i) extract from feature-quantity distributions feature quantities specific to each of the topics using a likelihood ratio to generate the driving behavior descriptions; and
    the driving behavior comparator module is configured to generate the anomaly score based on the driving behavior trend.

11. The risk assessment system of claim 10, wherein the behavior description generator module is configured to calculate the likelihood ratio based on: feature quantities corresponding to a particular bin; a predetermined one of the topics; a multinomial distribution indicative of a base feature-quantity distribution of the predetermined one of the topics; a conditional probability of the feature quantities given a multinomial distribution of the predetermined one of the topics; and a sum of conditional probabilities obtained for the topics.

12. The risk assessment system of claim 1, wherein the one or more other sets of features and topics correspond to the driving behaviors of the other drivers of vehicles other than the first vehicle for the location and the same or similar driving conditions as the first set of driving conditions.

13. A risk assessment system comprising:
a driving behavior comparator module configured to (i) perform comparisons between corresponding sets of features and topics for driving behaviors of a plurality of drivers, wherein each of the comparisons is for a same driving location and same or similar driving conditions, and (ii) generate a plurality of anomaly scores for the plurality of drivers based on results of the comparisons;
an assessment module configured to, based on the plurality of anomaly scores, determine at least one of a common driving behavior or a trend in the driving behaviors of the plurality of drivers for the driving locations and corresponding ones of the driving conditions; and
a transceiver configured to transmit information regarding the common driving behavior or the trend in the driving behaviors of the plurality of drivers to a target vehicle for at least one of training a driver of the target vehicle or autonomous control of the target vehicle.

14. The risk assessment system of claim 13, wherein:
the assessment module is configured to, based on the plurality of anomaly scores, calculate a risk assessment score for the driver of the target vehicle, wherein the risk assessment score indicates whether the driver of the target vehicle is driving more dangerously than other ones of the plurality of drivers; and
the transceiver is configured to transmit the risk assessment score to the target vehicle.

15. The risk assessment system of claim 13, wherein:
the assessment module is configured to (i) determine at least one of an average probability distribution function or an average cumulative distribution function for trips of the plurality of drivers at the driving locations, and (ii) based on the at least one of the average probability distribution function or the average cumulative distribution function, calculate a risk assessment score for the driver of the target vehicle; and
the transceiver is configured to transmit the risk assessment score to the target vehicle.

16. The risk assessment system of claim 13, wherein the information regarding the at least one of the common driving behavior or the trend in the driving behaviors of the plurality of drivers includes at least one of (i) average features of the driving behaviors of the plurality of drivers in the driving locations, (ii) driving patterns for the plurality of drivers driving in the driving locations, or (iii) trends in the driving behaviors of the plurality of drivers driving in the driving locations.

17. The risk assessment system of claim 13, wherein:
the driving behavior comparator module is configured to obtain information indicative of a driving behavior of the driver of the target vehicle; and
the assessment module are configured to generate a risk assessment score for the driver of the target vehicle based on (i) the information indicative of the driving behavior of the driver of the target vehicle, (ii) the common driving behavior, and (iii) the trend in the driving behaviors of the plurality of drivers; and
the transceiver is configured to transmit the risk assessment score to the target vehicle.

18. A system for a first vehicle, the system comprising:
a display;
a plurality of sensors and a global positioning system configured to determine a first plurality of parameters and driving conditions for a location of the first vehicle, wherein the first plurality of parameters indicate at least a current or upcoming location of the first vehicle;
a transceiver configured to transmit from the first vehicle the first plurality of parameters and driving conditions to a risk assessment server, wherein the risk assessment server is separate from the vehicle;
wherein the transceiver is configured to, based on the first plurality of parameters and driving conditions, receive information regarding a common driving behavior for a plurality of drivers, wherein the plurality of drivers do not include a first driver of the first vehicle, and wherein the common driving behavior is indicative of an average driving behavior of the plurality of drivers for the current or upcoming location;
at least one vehicle control module configured to, based on the information regarding the common driving behavior, at least one of (i) train the first driver of the first vehicle, or (ii) autonomously control operation of the first vehicle; and
a feature reporting module configured to subsequent to the at least one of (i) training the first driver, or (ii) autonomously controlling operation of the first vehicle, determine features and feature distributions based on a second plurality of parameters obtained from the plurality of sensors,
wherein
the transceiver is configured to (i) transmit at least one of the features or the feature distributions to the risk assessment server, (ii) receive a risk assessment score from the risk assessment server for the first driver of the first vehicle based on the at least one of the features or the feature distributions, and (iii) receive at least one of an insurance rate or a pay rate,
the at least one of the insurance rate or the pay rate are generated based on the risk assessment score, and
the at least one vehicle control module is configured to display the risk assessment score and the at least one of the insurance rate or the pay rate on the display.

19. The system of claim 18, wherein the at least one vehicle control module is configured to, based on the information regarding the common driving behavior, display indicators on the display to train the first driver of the first vehicle to have a driving behavior more like the average driving behavior of the plurality of drivers for the current or upcoming location.

20. The system of claim 18, wherein the at least one vehicle control module is configured to, based on the information regarding the common driving behavior, autonomously control operation of the first vehicle to match the average driving behavior of the plurality of drivers for the current or upcoming location.

21. The system of claim 18, wherein the at least one vehicle control module displays the insurance rate or the pay rate on the display to indicate to the first driver a current driving behavior of the first driver as an indicator that the first driver is driving safe or as an incentive to driver safer.

22. The system of claim 18, wherein the at least one vehicle control module is configured to display the risk assessment score and the at least one of the insurance rate or the pay rate on the display while the first vehicle is being driving by the first driver.

* * * * *